US012718721B2

United States Patent
(12) United States Patent
Kim et al.

(10) Patent No.: US 12,718,721 B2
(45) Date of Patent: Aug. 25, 2026

(54) DISPLAY MODULE AND INSPECTION METHOD OF THE SAME

(71) Applicant: SAMSUNG DISPLAY CO., LTD., Yongin-si (KR)

(72) Inventors: Hun-Tae Kim, Seoul (KR); Tae-Woung Byun, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 285 days.

(21) Appl. No.: 18/152,736

(22) Filed: Jan. 10, 2023

(65) Prior Publication Data

US 2023/0245606 A1 Aug. 3, 2023

(30) Foreign Application Priority Data

Jan. 24, 2022 (KR) ........................ 10-2022-0010153

(51) Int. Cl.
*G09G 3/00* (2006.01)
*G06F 1/16* (2006.01)

(52) U.S. Cl.
CPC ........... *G09G 3/006* (2013.01); *G06F 1/1616* (2013.01); *G06F 1/1652* (2013.01); *G09G 2330/12* (2013.01); *G09G 2380/02* (2013.01)

(58) Field of Classification Search
CPC ............... G09G 3/006; G09G 2380/02; G09G 2330/12; H05K 1/028; H05K 1/189; H05K 1/147; H05K 1/14; G06F 1/1616; G06F 1/1652
See application file for complete search history.

(56) References Cited

U.S. PATENT DOCUMENTS

| | | | | |
|---|---|---|---|---|
| 4,532,575 | A * | 7/1985 | Suwa | H01H 13/702 361/679.09 |
| 6,522,073 | B2 | 2/2003 | Wu et al. | |
| 11,169,629 | B2 | 11/2021 | Baek et al. | |
| 11,171,184 | B2 | 11/2021 | Lee et al. | |
| 11,837,118 | B2 * | 12/2023 | Park | G09F 9/301 |
| 11,907,031 | B2 * | 2/2024 | Kim | G06F 1/1686 |
| 11,994,911 | B2 * | 5/2024 | Kim | B32B 7/14 |
| 2019/0340959 | A1 * | 11/2019 | Park | H10K 59/8731 |
| 2020/0132912 | A1 | 4/2020 | Xu et al. | |
| 2022/0330416 | A1 * | 10/2022 | Zhang | H05K 1/189 |

FOREIGN PATENT DOCUMENTS

| | | |
|---|---|---|
| KR | 10-2020-0021682 | 3/2020 |
| KR | 10-2020-0032808 | 3/2020 |

* cited by examiner

*Primary Examiner* — Ke Xiao
(74) *Attorney, Agent, or Firm* — F. CHAU & ASSOCIATES, LLC

(57) ABSTRACT

A display module includes a display panel, a main circuit board, a bridge circuit board, and a compensator. The main circuit board includes a first circuit board that includes a main portion connected to the display panel and a protruding portion that protrudes from the main portion, and a first connector disposed in the protruding portion. The bridge circuit board includes a second circuit board that at least partially overlaps the first circuit board and a second connector disposed in the second circuit board and is coupled to the first connector. A separation space is formed between the first circuit board and the second circuit board, the separation space is located at one side of the coupled first connector and the second connector, and the compensator at least partially overlaps the separation space.

14 Claims, 18 Drawing Sheets

DM
DP
PLT2
ITAP2
PLT
PLT-F
OP
CNT1/CNT2
CM1
CB2
FS2
BS2
CNT3
BC
ELT
RHL1
PLT1
MC
BC
CM1
BDA
MC
DIC
AA2
BA
PP
MP
CB1
ITAP1
FS1
NFA20
FA0
NFA10
AA1
DR1
DR2
DR3

DISPLAY MODULE AND INSPECTION METHOD OF THE SAME

CROSS-REFERENCE TO RELATED APPLICATIONS

This U.S. non-provisional patent application claims priority under 35 U.S.C. § 119 from Korean Patent Application No. 10-2022-0010153, filed on Jan. 24, 2022 in the Korean Intellectual Property Office, the contents of which are herein incorporated by reference in their entirety.

TECHNICAL FIELD

Embodiments of the present disclosure herein are directed to a display module and an inspection method thereof.

DISCUSSION OF THE RELATED ART

In general, electronic devices such as smart phones, digital cameras, notebook computers, navigation systems, and smart televisions, which provide an image to a user, include a display device which displays the image. The display device generates an image and provides the image to a user through a display screen.

With the recent technological development of display devices, various types of display devices are being developed. For example, various flexible display devices, which can be transformed into a curved, folded or rolled shape, are being developed. The flexible display devices are easy to carry and improve the convenience of a user.

SUMMARY

Embodiments of the present disclosure provide a main circuit board and a bridge circuit board that inspects a display device that includes the main circuit board, and reduces defects in the bridge circuit board.

An embodiment of the inventive concept provides a display module that includes: a display panel that includes at least one pixel; a main circuit board that includes a first circuit board that includes a main portion connected to the display panel and a protruding portion that protrudes from the main portion, and a first connector disposed in the protruding portion; a bridge circuit board that includes a second circuit board that at least partially overlaps the first circuit board, and a second connector disposed in the second circuit board and coupled to the first connector; and a compensator. A separation space is formed between the first circuit board and the second circuit board, the separation space is located at one side of the coupled first connector and the second connector, and the compensator at least partially overlaps the separation space.

In an embodiment, the compensator is disposed within the separation space.

In an embodiment, the compensator is in contact with the first circuit board and the second circuit board.

In an embodiment, the compensator is attached only to the second circuit board.

In an embodiment, the compensator contains a polymer.

In an embodiment, the second circuit board includes a rear surface on which the second connector is disposed and a front surface opposite to the rear surface, and the compensator is disposed on the front surface of the second circuit board and overlaps the second connector.

In an embodiment, the compensator contains at least one of a metal or a polymer.

In an embodiment, the second circuit board includes a rear surface on which the second connector is disposed and a front surface opposite to the rear surface, the compensator includes a plurality of compensators, and the plurality of compensators include a first compensator in contact with the first and second circuit boards and a second compensator disposed on the front surface and that overlaps the second connector.

In an embodiment, the first compensator is attached only to the rear surface of the second circuit board.

In an embodiment, the first compensator contains a polymer, and the second compensator contains at least one of a metal or a polymer.

In an embodiment, the display panel includes a first region in which the pixel is disposed, a second region spaced apart from the first region, and a bendable region that is bent with respect to a first virtual axis that extends in a first direction and extends in a second direction that crosses the first direction from the first region to the second region, and the main circuit board is coupled to one end of the second region and is spaced apart from the bendable region of the display panel.

In an embodiment, the main circuit board and a portion of the bridge circuit board overlap the first region in a third direction that is normal to a plane defined by the first and second directions, and a remaining portion of the bridge circuit board does not overlap the first region in the third direction.

In an embodiment, the first region includes a foldable region that is folded with respect to a second virtual axis that extends in the first direction, and a first non-foldable region and a second non-foldable region that are spaced apart from each other in a second direction that crosses the first direction with the foldable region interposed therebetween.

In an embodiment, the main portion includes a first main portion that extends in a first direction and a second main portion that extends from one side of the first main portion in a second direction that crosses the first direction, and the protruding portion includes a first protruding portion that extends from the second main portion in the second direction and a second protruding portion that extends from the first protruding portion in the second direction and includes the second connector disposed therein. The separation space is formed between the first protruding portion and the second circuit board. In the first direction, a maximum width of the first protruding portion is less than a maximum width of the second main portion and a maximum width of the second protruding portion.

In an embodiment, the second circuit board includes a first portion that overlaps the protruding portion in a third direction that is normal to a plane defined by the first and second directions and a second portion that does not overlap the protruding portion in the third direction, and the bridge circuit board further includes a third connector disposed at one end of the second portion.

In an embodiment of the inventive concept, a method of inspecting a display module includes: providing a board assembly that includes a main circuit board, a bridge circuit board connected to the main circuit board, and a compensator that overlaps at least a portion of a separation space between the main circuit board and the bridge circuit board, where the main circuit board is connected to a display panel that includes at least one pixel; inspecting the main circuit board using an inspection device that is connected to the bridge circuit board; and removing the bridge circuit board and the compensator from the main circuit board.

In an embodiment, the main circuit board includes a first circuit board and a first connector disposed in the first circuit board, the bridge circuit board includes a second circuit board that at least partially overlaps the first circuit board and a second connector disposed in the second circuit board and coupled to the first connector, and the compensator includes at least one of a first compensator disposed in the separation space or a second compensator disposed on the second compensator and that overlaps the separation space and the second connector.

In an embodiment, the bridge circuit board further includes a third connector disposed in the second circuit board. Before inspecting the main circuit board, the method includes coupling the third connector to the inspection device In an embodiment, the display panel includes a bendable region that is bent with respect to a virtual axis that extends in a first direction, a first region in which the pixel is disposed, and a second region spaced apart from the first region in a second direction that crosses the first direction with the bendable region interposed therebetween. The method further includes, prior to providing the board assembly, coupling the board assembly to the second region of the display panel, inspecting the board assembly coupled to the display panel, and bending the bendable region of the display panel with respect to the virtual axis.

In an embodiment of the inventive concept, a display module includes: a main circuit board that includes a first circuit board that includes a main portion connected to a display panel and a protruding portion that protrudes from the main portion, and a first connector disposed in the protruding portion; a bridge circuit board that includes a second circuit board that at least partially overlaps the first circuit board, and a second connector disposed on a rear surface of the second circuit board and that overlaps the first connector; and a plurality of compensators. A separation space is formed between the first circuit board and the second circuit board and one side of the first connector and the second connector, and the plurality of compensators include a first compensator in in the separation space and a second compensator disposed on a front surface of the second circuit board that is opposite to the rear surface and that overlaps the second connector.

According to embodiments of the present inventive concept, a separation space between the main circuit board and the bridge circuit board can prevent bending of the bridge circuit board or separating the bridge circuit board from the connector. Accordingly, the occurrence of defects in the bridge circuit board is reduced and the inspection reliability of the display module is increased.

BRIEF DESCRIPTION OF THE FIGURES

Figure 13A:
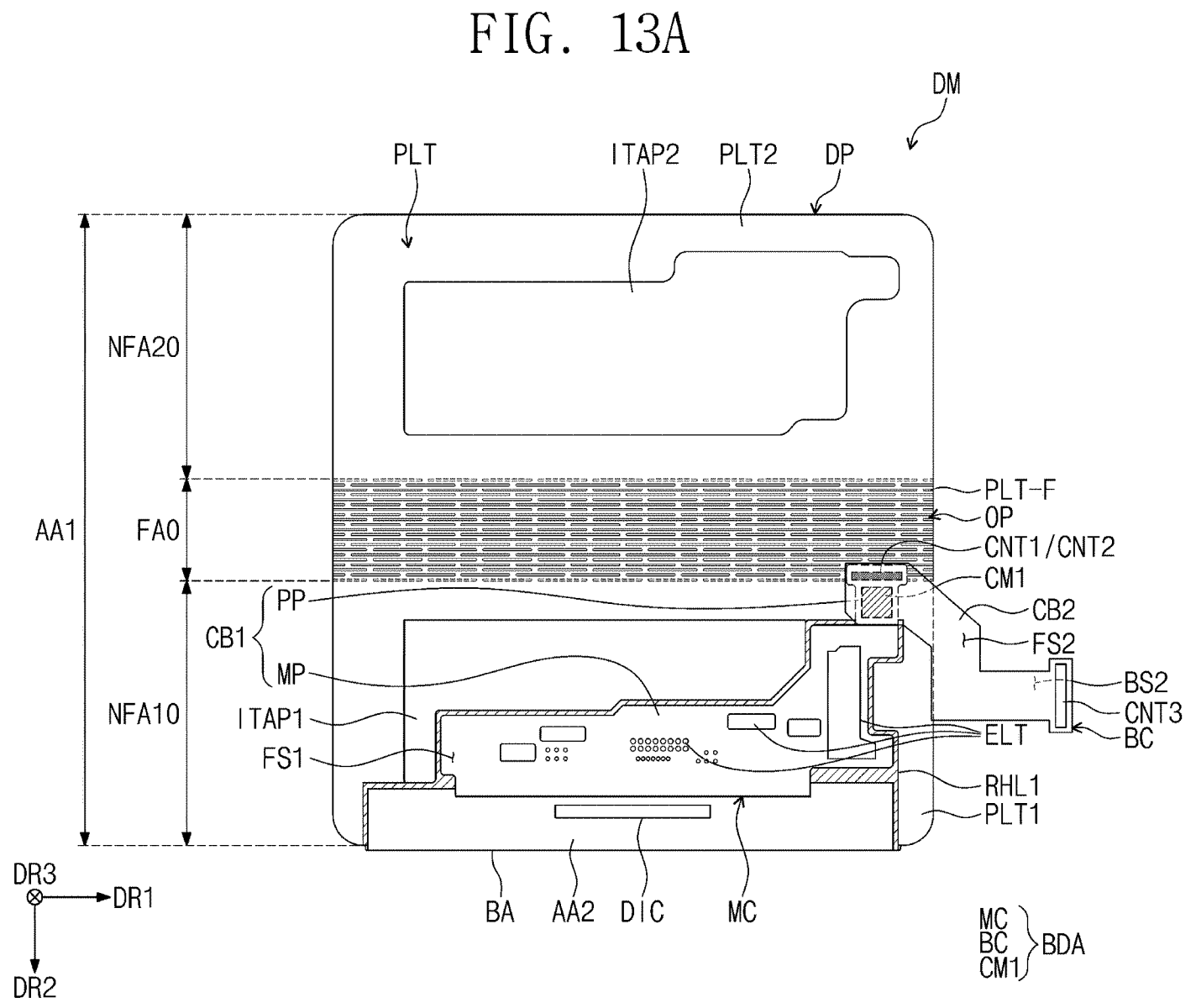
Figure 13B:
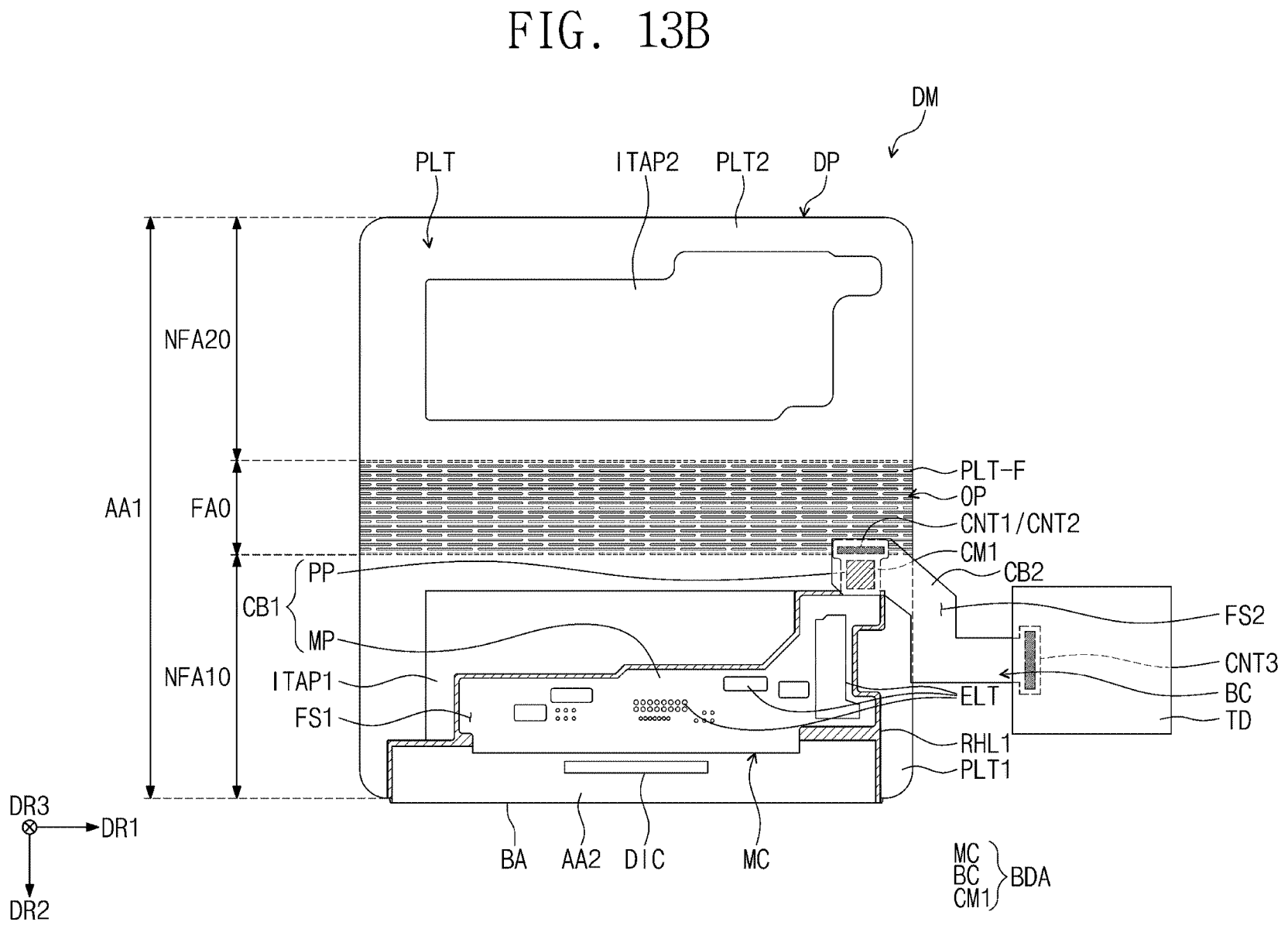

FIGS. 13A to 13C illustrate an inspection method of a display module according to an embodiment of the inventive concept.

DETAILED DESCRIPTION

Figure 1:
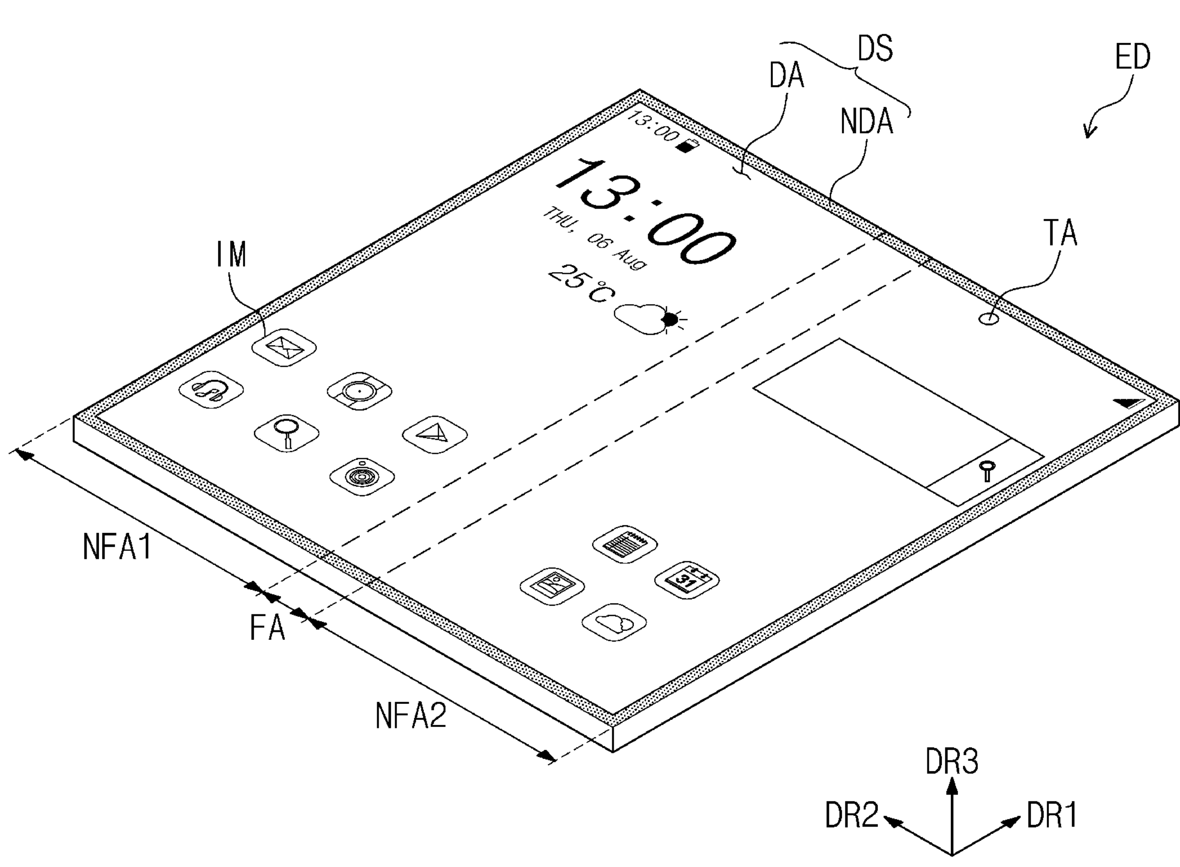
FIG. 1 is a perspective view of an electronic device according to an embodiment of the inventive concept.

In this specification, it will be understood that when an element (or region, layer, portion, etc.) is referred to as being "on", "connected to" or "coupled to" another element, it can be directly on, connected or coupled to the other element, or intervening elements may be present.

Like reference numerals may refer to like elements throughout.

Hereinafter, embodiments of the inventive concept will be described with reference to the accompanying drawings.

Figure 2A:
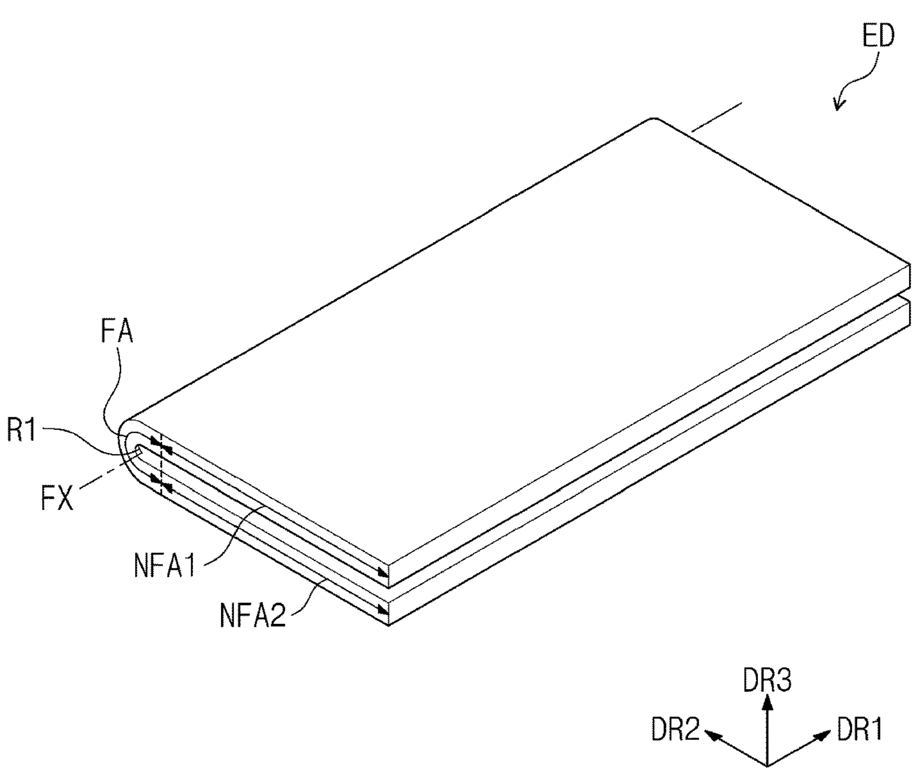
FIGS. 2A and 2B are perspective views of a folded electronic device according to an embodiment of the inventive concept.
Figure 2B:
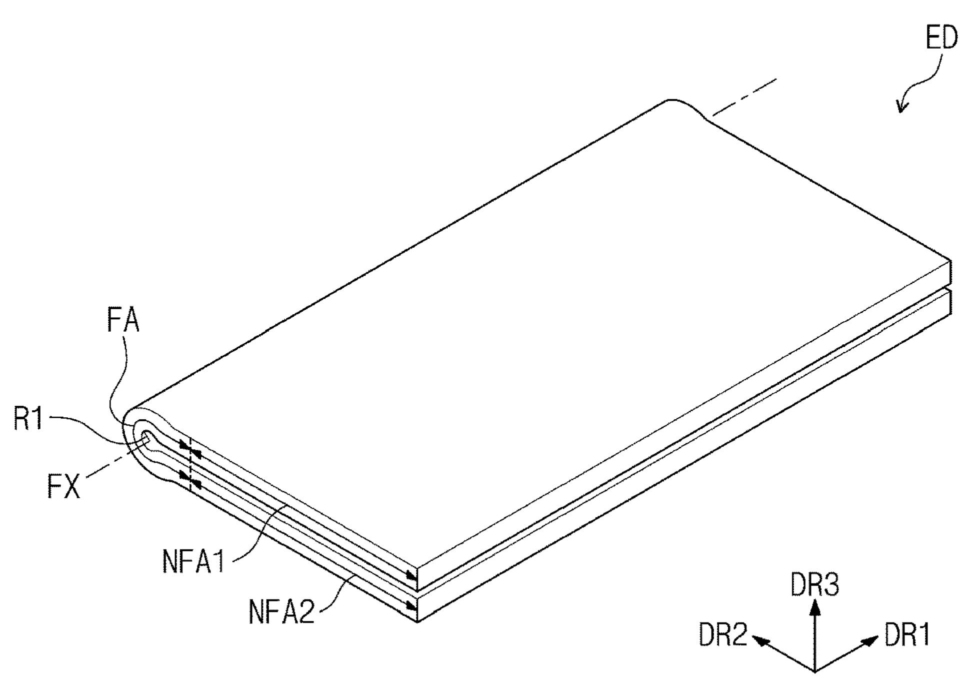

FIG. 1 is a perspective view of an electronic device ED according to an embodiment of the inventive concept. FIGS. 2A and 2B are perspective views of a folded electronic device according to an embodiment of the inventive concept.

Referring to FIGS. 1 to 2B, in an embodiment, the electronic device ED can be activated by an electrical signal. The electronic device ED includes various embodiments. For example, the electronic device ED may be a tablet, a notebook computer, a computer, a smart television, etc. In an embodiment, the electronic device ED is illustrated as a smart phone.

The electronic device ED according to an embodiment of the inventive concept includes a display surface DS that extends in a first direction DR1 and a second direction DR2 that crosses the first direction DR1. The electronic device ED provides an image IM to a user through the display surface DS.

The display surface DS includes a display region DA and a non-display region NDA around the display region DA. The display region DA displays an image IM, and the non-display region NDA does not display an image IM. The non-display region NDA surrounds the display region DA. However, an embodiment of the inventive concept is not necessarily limited thereto, and in other embodiments, the shape of the display region DA and the shape of the non-display region NDA can change, and at least a portion of the non-display region NDA may be omitted.

The display surface DS includes a sensing region TA. The sensing region TA is a partial region of the display region DA. The sensing region TA has a higher transmittance than other regions of the display region DA. Hereinafter, the other regions of the display region DA, except for the sensing region TA, are defined as a general display region.

An optical signal, such as visible light or infrared light, may be incident on the sensing region TA. The electronic device ED captures an external image using visible light that passes through the sensing region TA or determines the accessibility of an external object using infrared light that passes through the sensing region TA. Although one sensing region TA is illustrated in FIG. 1, embodiments of the inventive concept is not necessarily limited thereto, and in other embodiment, a plurality of sensing regions TA are provided.

Hereinafter, a direction substantially perpendicular to a plane defined by the first direction DR1 and the second direction DR2 is defined as a third direction DR3. The third direction DR3 is a reference for distinguishing the front and rear surfaces of each member. In this specification, the expression "on a plane" is defined as being viewed from the third direction DR3.

The electronic device ED includes a foldable region FA and a plurality of non-foldable regions NFA1 and NFA2. The non-foldable regions NFA1 and NFA2 include a first non-foldable region NFA1 and a second non-foldable region NFA2. The foldable region FA may be disposed between the first non-foldable region NFA1 and the second non-foldable region NFA2 in the second direction DR2.

As illustrated in FIG. 2A, the foldable region FA can be folded with respect to a folding axis FX that extends in the first direction DR1, and the electronic device ED can be in-folded so that the first non-foldable region NFA1 and the second non-foldable region NFA2 face each other and the display surface DS is not externally exposed. In this case, the foldable region FA is folded with a predetermined radius of curvature R1.

In an embodiment of the inventive concept, the electronic device ED can be out-folded so that the display surface DS is externally exposed. The electronic device ED can be configured to be repeatedly in-folded or be repeatedly out-folded, but embodiments of the inventive concept are not necessarily limited thereto. In an embodiment of the inventive concept, the electronic device ED can perform any one of an unfolding operation, an in-folding operation, or an out-folding operation.

As illustrated in FIG. 2B, according to an embodiment of the inventive concept, the distance between the first non-foldable region NFA1 and the second non-foldable region NFA2 is less than the radius of curvature R1. FIGS. 2A and 2B illustrate an embodiment in which the display surface DS (see FIG. 1), and a case EDC (see FIG. 3) that constitutes the exterior of the electronic device ED are in contact with the end regions of the first non-foldable region NFA1 and the second non-foldable region NFA2.

Figure 3:
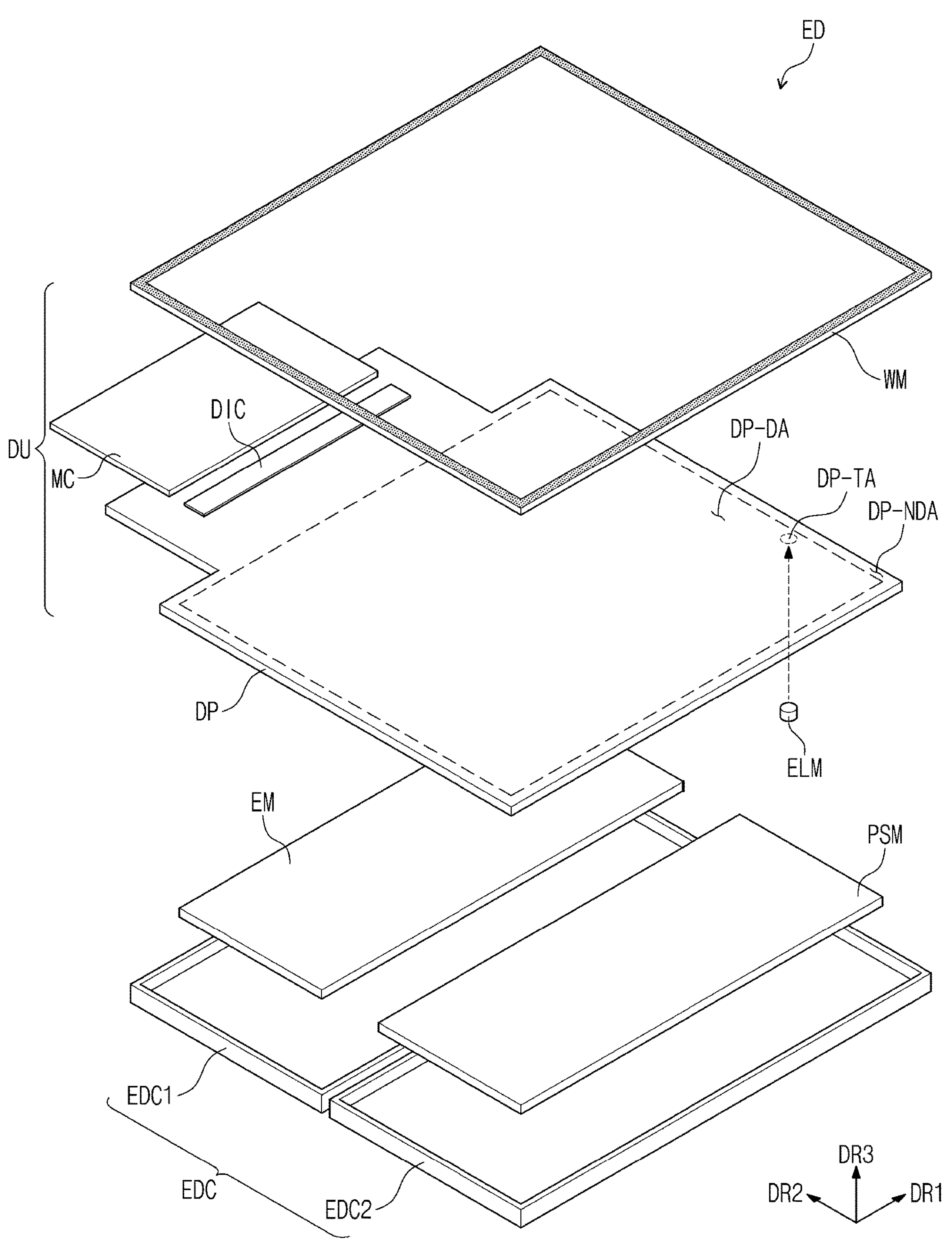
FIG. 3 is an exploded perspective view of an electronic device according to an embodiment of the inventive concept.
Figure 4:
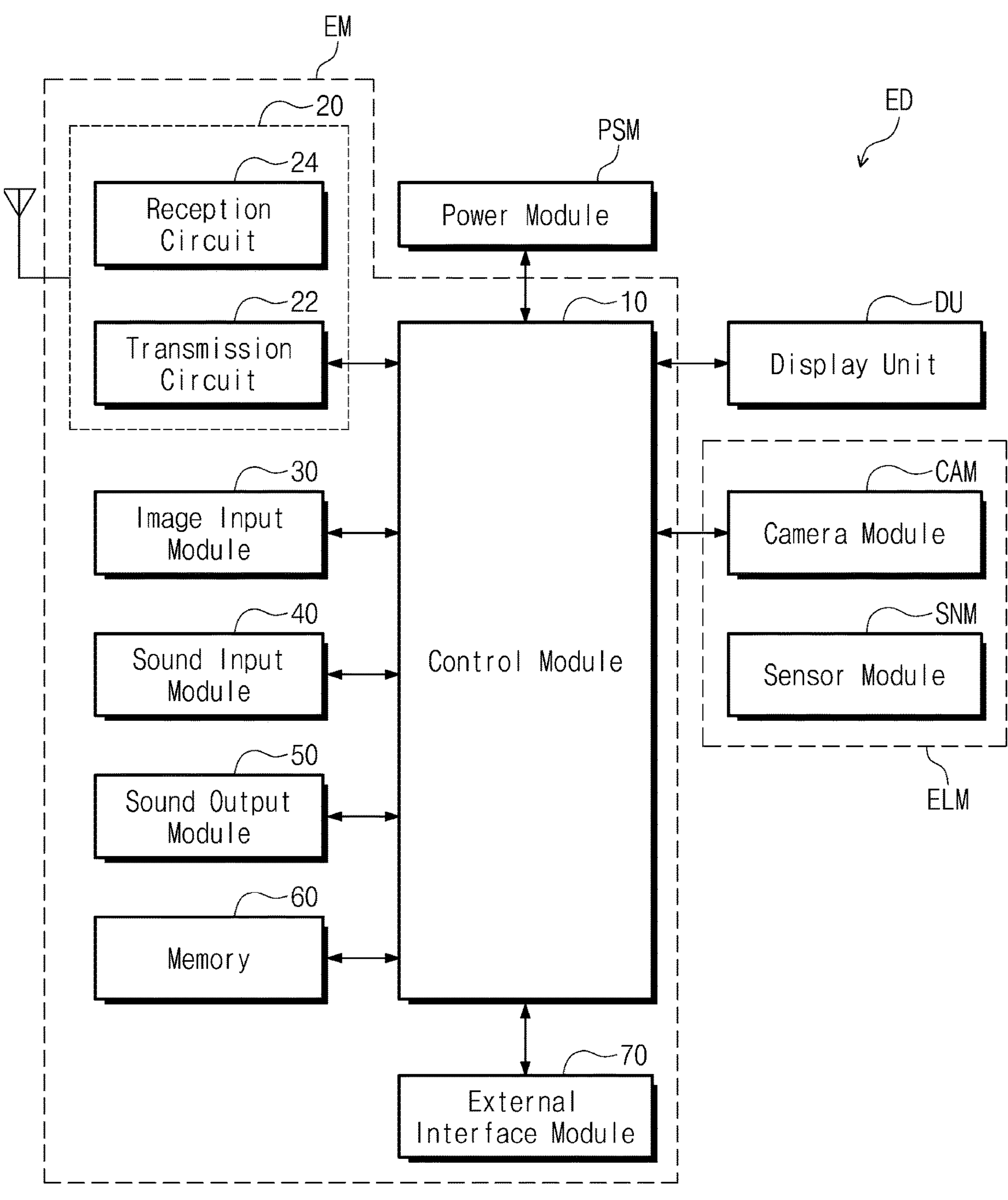
FIG. 4 is a block diagram of an electronic device according to an embodiment of the inventive concept.

FIG. 3 is an exploded perspective view of the electronic device ED according to an embodiment of the inventive concept. FIG. 4 is a block diagram of the electronic device ED according to an embodiment of the inventive concept.

Referring to FIGS. 3 and 4, in an embodiment, the electronic device ED include a display unit DU, an electronic module EM, a power module PSM, an electro-optical module ELM, and a case EDC. In addition, the electronic device ED further includes a mechanical structure that controls the folding operation of the display unit DU.

The display unit DU generates an image IM (see FIG. 1) and detects an external input. The display unit DU includes a window module WM, a unit module UM (see FIG. 5B), and a main circuit board MC.

The window module WM provides the display surface DS (see FIG. 1) of the electronic device ED. The window module WM is disposed on and protects the unit module UM to be described below. The window module WM transmits light generated from the unit module UM to a user.

The unit module UM includes at least a display panel DP. FIG. 3 illustrates only the display panel DP of the unit module UM, but the unit module UM further includes a plurality of components disposed on the display panel DP. A detailed description of the stacked structure of the unit module UM will be given below.

The display panel DP generates an image IM (see FIG. 1). The display panel DP is not particularly limited, and may be, for example, a light-emitting display panel such as an organic light-emitting display panel or a quantum-dot light-emitting display panel.

The display panel DP includes a display region DP-DA and a non-display region DP-NDA that respectively correspond to the display region DA (see FIG. 1) and the non-display region NDA (see FIG. 1) of the electronic device ED. In this specification, an expression "a region/portion corresponds to another region/portion" means that they overlap each other, but the regions/portions do not necessarily have a same area.

The display panel DP includes a sensing region DP-TA that corresponds to the sensing region TA (see FIG. 1) of the electronic device ED. The sensing region DP-TA has a lower resolution than the display region DP-DA.

A driving chip DIC is mounted on the non-display region DP-NDA of the display panel DP. The driving chip DIC may be manufactured and mounted in the form of an integrated circuit chip. However, embodiments of inventive concept are not necessarily limited thereto, and in other embodiments, the driving chip DIC is mounted on the main circuit board MC.

The main circuit board MC is connected to the non-display region DP-NDA of the display panel DP. A detailed description of the main circuit board MC will be given below.

The electronic module EM and the power module PSM are disposed under the display panel DP. In addition, the electronic module EM and the power module PSM are connected to each other through a separate printed circuit board.

The electronic module EM is a circuit that controls the operation of the display unit DU. As illustrated in FIG. 4, the electronic module EM includes a control module (a control circuit) 10, a wireless communication module (a communication circuit) 20, an image input module (an image input circuit) 30, a sound input module (a sound input circuit) 40, a sound output module (a sound output circuit) 50, a memory (a memory circuit) 60, an external interface module (an interface circuit) 70, etc. The modules may be mounted on a circuit board or electrically connected to each other through a flexible circuit board. The electronic module EM is electrically connected to the power module PSM.

The control module 10 controls the overall operation of the electronic device ED. For example, the control module 10 can activate or deactivate the unit module UM according to a user's input. The control module 10 controls the image input module 30, the sound input module 40, the sound output module 50, etc., according to a user's input. The control module 10 includes at least one microprocessor.

In an embodiment, the wireless communication module 20 can transmit/receive a wireless signal to/from other terminals using a Bluetooth or Wi-Fi protocol. In an embodiment, the wireless communication module 20 can transmit/receive a voice signal using a general communication line. The wireless communication module 20 includes a transmission circuit 22 that modulates a signal to be transmitted and transmits the signal, and a reception circuit 24 that demodulates a received signal.

The image input module 30 processes an image signal and converts the image signal into image data that can be displayed on the display unit DU. The sound input module 40 receives a sound signal by a microphone in a recording mode or a voice recognition mode and converts the sound signal into electrical data. The sound output module 50 converts sound data received from the wireless communication module 20 or sound data stored in the memory 60 into an audio signal and outputs the audio signal through a speaker, etc.

The external interface module 70 is an interface that is connected to one or more of an external charger, a wired/wireless data port, a card socket, such as a memory card or a SIM/UIM card, etc.

The power module PSM is a circuit that supplies power to the electronic module EM. The power module PSM supplies power for the overall operation of the electronic device ED. The power module PSM may include a conventional battery.

The electro-optical module ELM is disposed under the display panel DP. The electro-optical module ELM overlaps the sensing region DP-TA. The electro-optical module ELM is an electronic component or circuit that outputs or receives an optical signal. The electro-optical module ELM includes a camera module CAM and/or a sensor module SNM. The camera module CAM captures an external image through the sensing region DP-TA.

The case EDC accommodates the display unit DU, the electronic module EM, and the power module PSM. The case EDC includes a first case EDC1 and a second case EDC2 that can fold the display unit DU. The first and second cases EDC1 and EDC2 extend in the first direction DR1 and are arranged in the second direction DR2.

In addition, the electronic device ED further includes a hinge structure that connects the first and second cases EDC1 and EDC2. The case EDC is coupled to the window module WM. The case EDC protects the display unit DU, the electronic module EM, and the power module PSM.

Figure 5A:
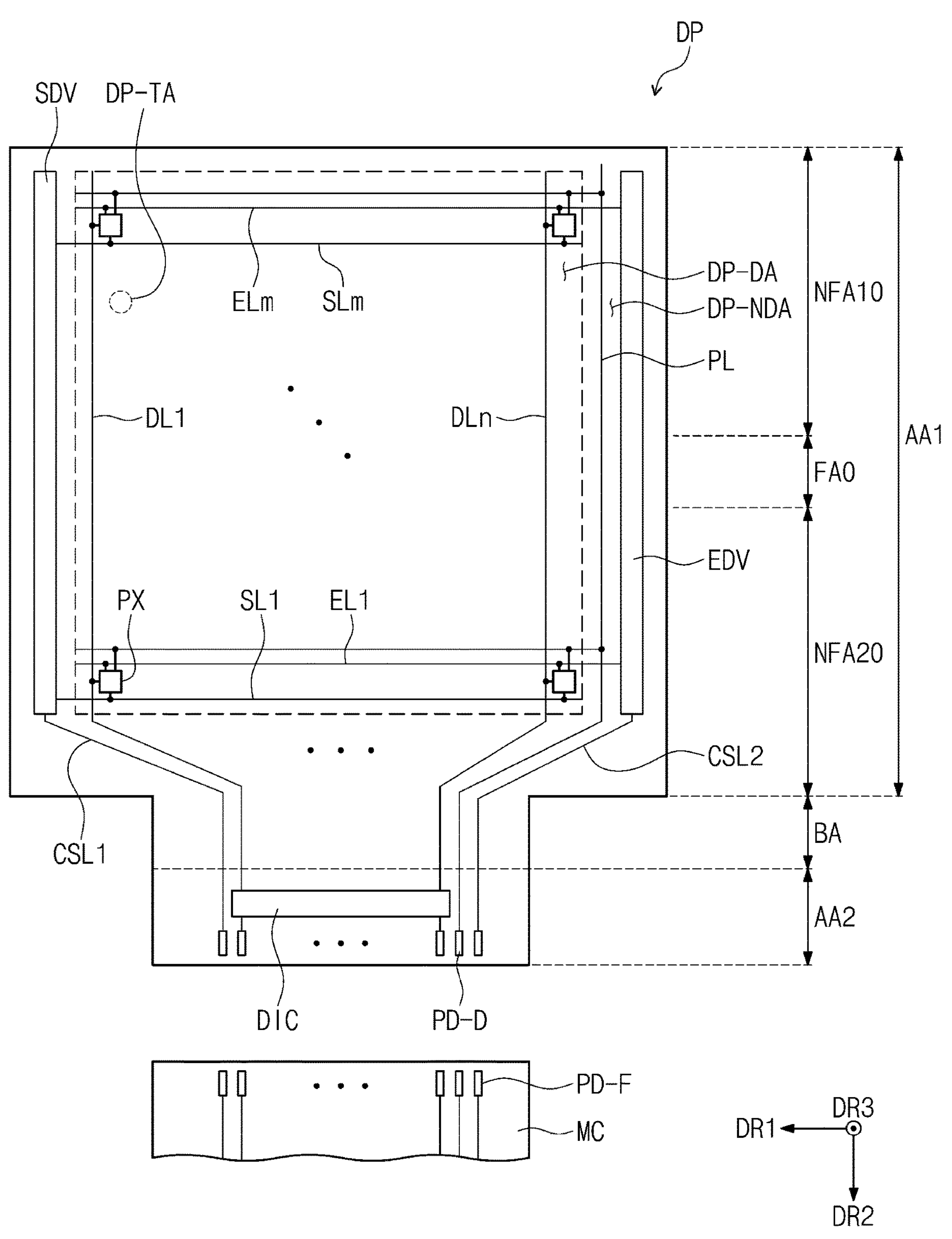
FIG. 5A is a plan view of a display panel according to an embodiment of the inventive concept.
Figure 5B:
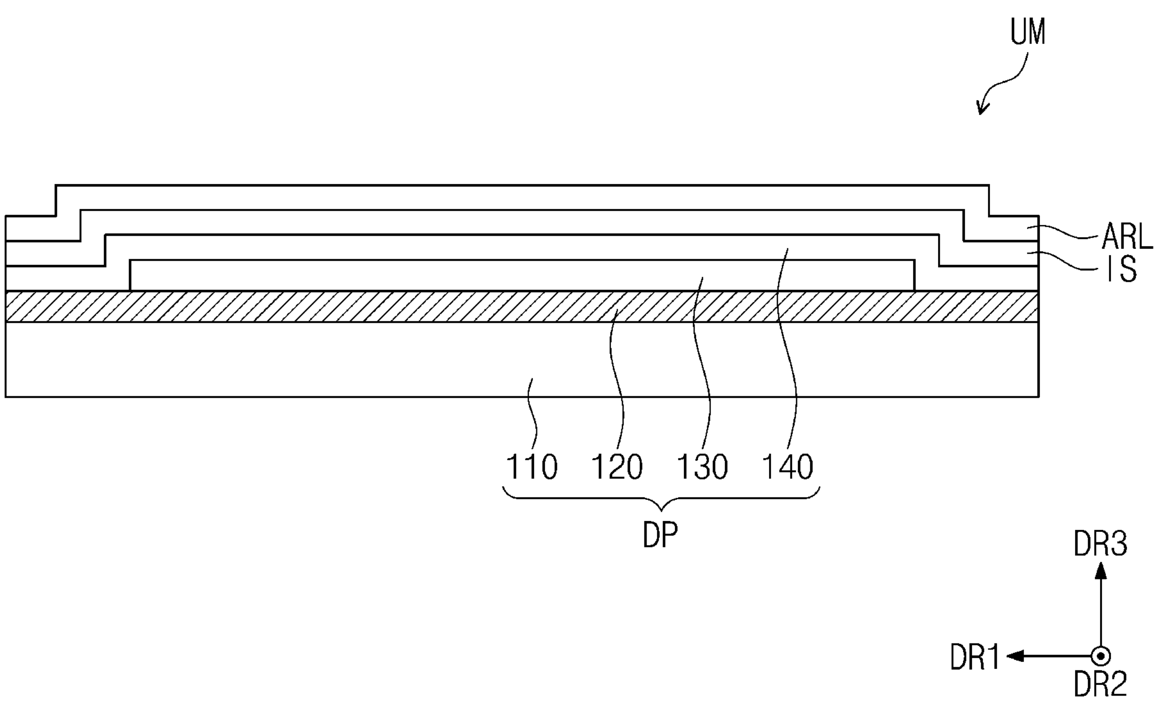
FIG. 5B is a cross-sectional view of a unit module according to an embodiment of the inventive concept.

FIG. 5A is a plan view of a display panel DP according to an embodiment of the inventive concept. FIG. 5B is a cross-sectional view of a unit module UM according to an embodiment of the inventive concept.

Referring to FIG. 5A, in an embodiment, the display panel DP includes a display region DP-DA and a non-display region DP-NDA adjacent to the display region DP-DA. The display region DP-DA and the non-display region DP-NDA are classified by the presence of a pixel PX, and the pixel PX is disposed in the display region DP-DA. A scan driver SDV, a data driver, and a light-emitting driver EDV are disposed in the non-display region DP-NDA. The data driver may be a partial circuit configured in the driving chip DIC illustrated in FIG. 3.

The display panel DP includes a first region AA1, a second region AA2, and a bendable region BA that is divided in the second direction DR2. The second region AA2 and the bendable region BA are partial regions of the non-display region DP-NDA. The bendable region BA is disposed between the first region AA1 and the second region AA2.

When the bendable region BA is bent, the rear surface of the display panel DP in the first region AA1 and the rear surface of the display panel DP in the second region AA2 face each other.

The first region AA1 corresponds to the display surface DS of FIG. 1. The first region AA1 includes a first non-foldable region NFA10, a second non-foldable region NFA20, and a foldable region FA0. The first non-foldable region NFA10, the second non-foldable region NFA20, and the foldable region FA0 correspond respectively to the first non-foldable region NFA1, the second non-foldable region NFA2, and the foldable region FA of FIGS. 1 to 2B.

The length of each of the bendable region BA and the second region AA2 in the first direction DR1 is less than the length of the first region AA1. Accordingly, the bendable region BA can be bent relatively easily.

The display panel DP includes a plurality of pixels PX, a plurality of scan lines SL1 to SLm, a plurality of data lines DL1 to DLn, a plurality of light-emitting lines EL1 to ELm, first and second control lines CSL1 and CSL2, a power line PL, and a plurality of display pads PD-D, wherein in and n are positive integers. The pixels PX are connected to the scan lines SL1 to SLm, the data lines DL1 to DLn, and the light-emitting lines EL1 to ELm.

The scan lines SL1 to SLm extend in the first direction DR1 and are connected to the scan driver SDV. The data lines DL1 to DLn extend in the second direction DR2 and are connected to the driving chip DIC through the bendable region BA. The light-emitting lines EL1 to ELm extend in the first direction DR1 and are connected to the light-emitting driver EDV.

The power line PL includes a portion that extends in the second direction DR2 and a portion that extends in the first direction DR1. The portion extending in the first direction DR1 and the portion extending in the second direction DR2 are disposed on different layers. A portion of the power line PL that extends in the second direction DR2 extends to the second region AA2 through the bendable region BA. The power line PL provides a first voltage to the pixels PX.

The first control line CSL1 is connected to the scan driver SDV and extends toward the lower end of the second region AA2 through the bendable region BA. The second control line CSL2 is connected to the light-emitting driver EDV and extends toward the lower end of the second region AA2 through the bendable region BA.

On a plane, the display pads PD-D are disposed adjacent to the lower end of the second region AA2. The driving chip DIC, the power line PL, the first control line CSL1, and the second control line CSL2 are connected to the display pads PD-D. The main circuit board MC includes board pads PD-F, each of which is connected to a corresponding display pad PD-D by an anisotropic conductive adhesive layer.

The sensing region DP-TA has a higher light transmittance and a lower resolution than the display region DP-DA. Light transmittance and resolution are measured in a reference area. In the reference area, the occupancy percentage of a light blocking structure in the sensing region DP-TA is less than the occupancy percentage of a light blocking structure in the display region DP-DA. The light blocking structure includes a conductive pattern of a circuit layer 120 (see FIG. 5B) to be described below, an electrode of a light-emitting element, a light blocking pattern, etc.

In the reference area, the sensing region DP-TA has a lower resolution than the display region DP-DA. In the reference area, or in the same area, a smaller number of pixels PX are disposed in the sensing region DP-TA than in the display region DP-DA.

According to an embodiment of the inventive concept, the pixels PX disposed in the display region DP-DA and the pixels PX disposed in the sensing region DP-TA have different light-emitting areas when the areas of same color pixels are compared. In addition, the display region DP-DA and the sensing region DP-TA are also different from each other in the arrangement of a pixel unit that includes pixels PX that emit different colors. The light-emitting area of the pixels PX disposed in the display region DP-DA and the sensing region DP-TA and the arrangement of the pixels PX in a pixel unit are not necessarily limited to one embodiment.

Referring to FIG. 5B, in an embodiment, the unit module UM includes a display panel DP, an input sensor IS, and an anti-reflection layer ARL. The display panel DP may include a base layer 110, a circuit layer 120, a light-emitting element layer 130, and an encapsulation layer 140.

The base layer 110 provides a base surface on which the circuit layer 120 is disposed. The base layer 110 is a flexible substrate that can be bent, folded, rolled, etc. The base layer 110 may be one of a glass substrate, a metal substrate, or a polymer substrate. However, embodiments of the inventive concept are not necessarily limited thereto, and in other embodiments, the base layer 110 is one of an inorganic layer, an organic layer, or a composite material layer.

The base layer 110 has a multi-layered structure. For example, the base layer 110 includes a first synthetic resin layer, a single- or multi-layered inorganic layer, and a second synthetic resin layer disposed on the single- or multi-layered inorganic layer. Each of the first and second synthetic resin layers contains a polyimide-based resin, but embodiments of the inventive concept are not necessarily limited. In addition, only the first synthetic resin layer is provided as the base layer 110, but embodiments of the inventive concept are not necessarily limited thereto.

The circuit layer 120 is disposed on the base layer 110. The circuit layer 120 includes an insulating layer, a semiconductor pattern, a conductive pattern, and a signal line, etc.

The light-emitting element layer 130 is disposed on the circuit layer 120. The light-emitting element layer 130 includes a light-emitting element. For example, the light-emitting element is one of an organic light-emitting material, an inorganic light-emitting material, an organic-inorganic light-emitting material, a quantum dot, a quantum rod, a micro LED, or a nano LED.

The encapsulation layer 140 is disposed on the light-emitting element layer 130. The encapsulation layer 140 protects the light-emitting element layer 130 from moisture, oxygen, and foreign substances such as dust particles. The encapsulation layer 140 includes at least one inorganic layer. The encapsulation layer 140 includes a stacked structure of an inorganic layer/an organic layer/an inorganic layer.

The input sensor IS is disposed directly on the display panel DP. The display panel DP and the input sensor IS are formed through a continuous process. The expression "disposed directly" means that no third component is disposed between the input sensor IS and the display panel DP. That is, no separate adhesive layer is disposed between the input sensor IS and the display panel DP.

The anti-reflection layer ARL is disposed directly on the input sensor IS. The anti-reflection layer ARL reduces the reflectance of externally light incident on the display unit DU.

The anti-reflection layer ARL includes color filters. The color filters have a predetermined arrangement. For example, the color filters are arranged based on the light-emitting colors of the pixels in the display panel DP. In addition, the anti-reflection layer ARL further includes a black matrix adjacent to the color filters.

In an embodiment of the inventive concept, the stacking order of the input sensor IS and the anti-reflection layer ARL can be interchanged. In an embodiment of the inventive concept, the anti-reflection layer ARL is replaced with a polarizing film. The polarizing film is coupled to the input sensor IS by an adhesive layer.

Figure 6:
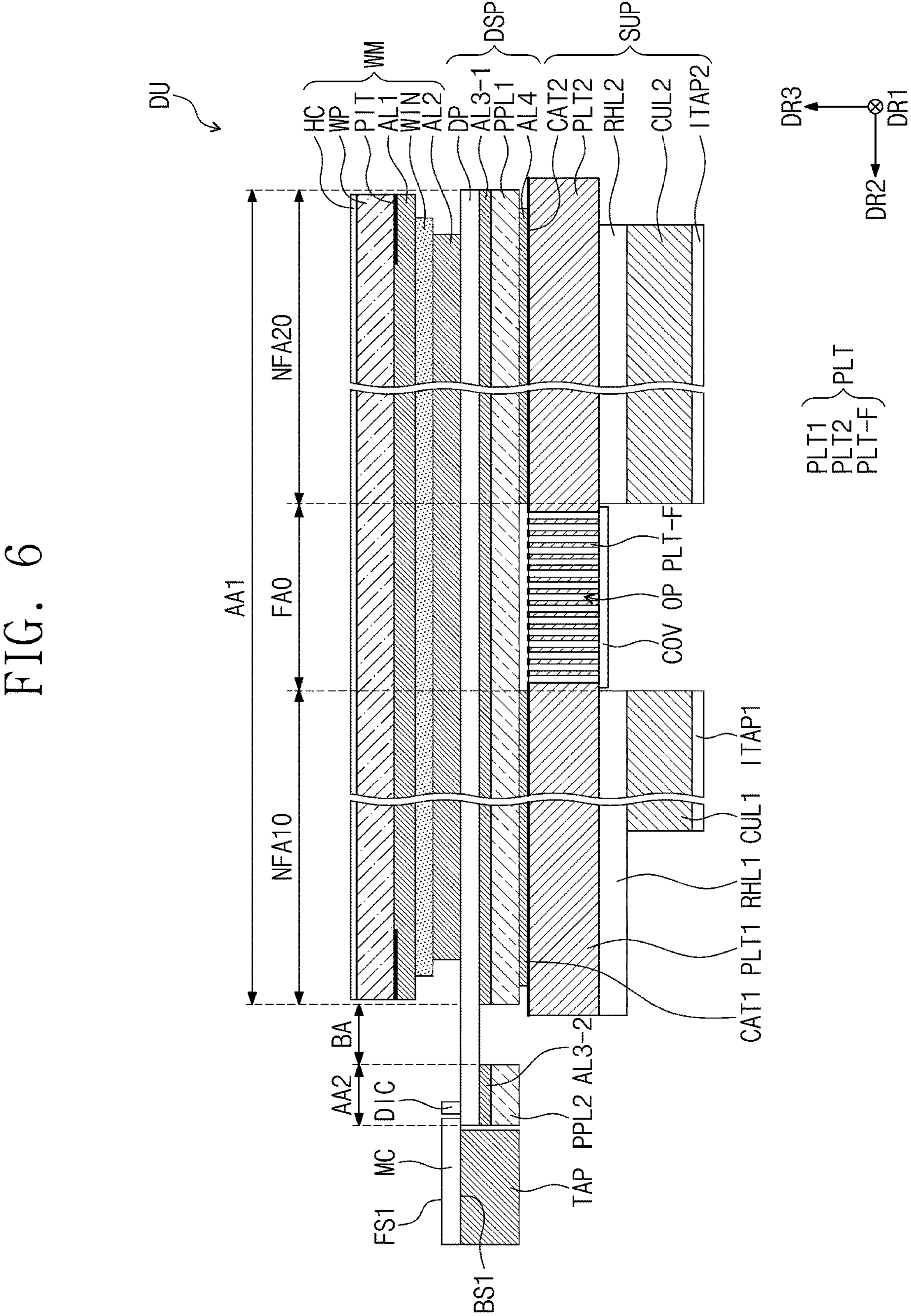
FIG. 6 is a cross-sectional view of a display unit according to an embodiment of the inventive concept.
Figure 7:
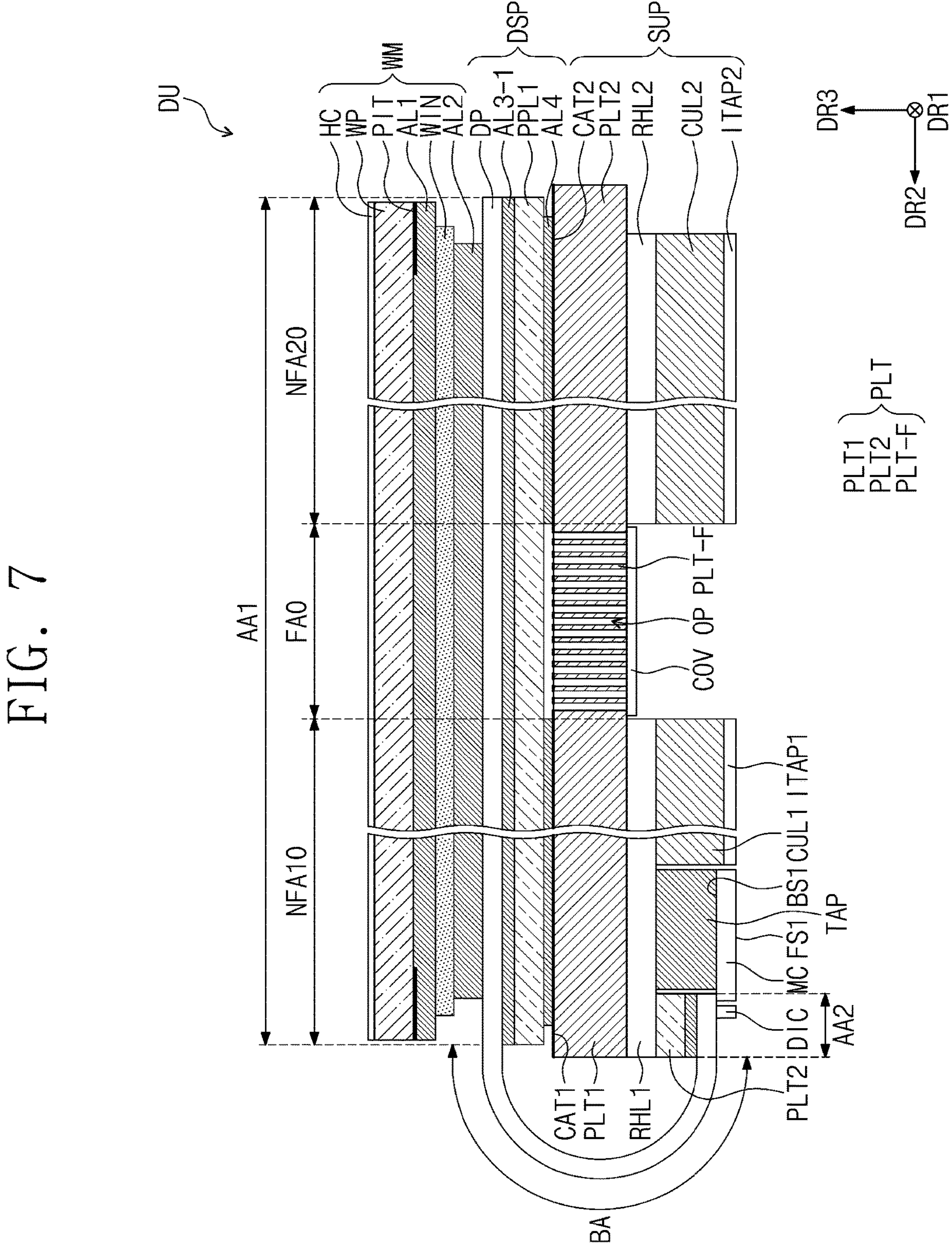
FIG. 7 is a cross-sectional view of a display unit according to an embodiment of the inventive concept.

FIG. 6 is a cross-sectional view of a display unit DU according to an embodiment of the inventive concept. FIG. 7 is a cross-sectional view of the display unit DU according to an embodiment of the inventive concept.

In FIGS. 6 and 7, in an embodiment, regions that divide the display unit DU are illustrated based on the display panel DP of FIG. 5A, and only the display panel DP of the unit module UM (see FIG. 5B) is illustrated. FIG. 6 illustrates the display unit DU in a state in which the bendable region BA of the display panel DP is not bent, and FIG. 7 illustrates the display unit DU in a state in which the bendable region BA of the unit module UM is bent.

The display unit DU includes a window module WM, a display portion DSP, and a support portion SUP.

The window module WM includes a window WIN, a window protective layer WP, a hard coating layer HC, a printed layer PIT, and first and second adhesive layers AL1 and AL2.

The window WIN protects the display unit DU from external scratches. The window WIN is optically transparent. The window WIN contains glass. However, embodiments of the inventive concept are not necessarily limited thereto, and in an embodiment, the window WIN includes a synthetic resin film.

The window protection layer WP is disposed on the upper surface of the window WIN. The window protective layer WP includes a flexible plastic such as polyimide (PI) or polyethylene terephthalate (PET).

The hard coating layer HC is disposed on the upper surface of the window protective layer WP. The hard coating layer HC is coated on the upper surface of the window protective layer WP.

The printed layer PIT is disposed on the lower surface of the window protective layer WP. The printed layer PIT is black, but the color of the printed layer PIT is not necessarily limited thereto. The printed layer PIT is adjacent to the edge of the window protective layer WP.

The first adhesive layer AL1 is disposed between the window protection layer WP and the window WIN. The window protective layer WP and the window WIN are bonded to each other by the first adhesive layer AL1. The first adhesive layer AL1 covers the printed layer PIT.

The second adhesive layer AL2 is disposed between the window WIN and the unit module UM (refer to FIG. 5B). The window WIN and the unit module UM (refer to FIG. 51) are bonded to each other by the second adhesive layer AL2. According to an embodiment of the inventive concept, the second adhesive layer AL2 is disposed between the window WIN and the anti-reflection layer ARL (see FIG. 58) of the unit module UM (see FIG. 58). Note that for convenience of illustration, the input sensor IS and the anti-reflection layer ARL of the unit module UM are not shown in FIGS. 6 and 7.

The display portion DSP includes at least a unit module UM that includes a display panel DP (see FIG. 5B), panel protective layers PPL1 and PPL2, and third and fourth adhesive layers AL3-1, AL3-2, and AL4. Since the display panel DP and the unit module UM that includes the display panel DP have been described with reference to FIGS. 5A and 5B, a repeated detailed description thereof will be omitted.

The panel protective layers PPL1 and PPL2 are disposed under the display panel DP. The panel protective layers PPL1 and PPL2 protect the lower portion of the display panel DP. The panel protective layers PPL1 and PPL2 include a flexible synthetic resin film. For example, the panel protective layers PPL1 and PPL2 contain polyethylene terephthalate.

In an embodiment of the inventive concept, the panel protective layers PPL1 and PPL2 include a first panel protective layer PPL1 that protects the first region AA1 of the display panel DP and a second panel protective layer PPL2 that protects the second region AA2 thereof. The panel protective layers PPL1 and PPL2 are not disposed in the bendable region BA.

The third adhesive layers AL3-1 and AL3-2 are respectively disposed between the panel protective layers PPL1 and PPL2 and the display panel DP. The third adhesive layers AL3-1 and AL3-2 respectively couple the panel protective layers PPL1 and PPL2 and the display panel DP to each other. The third adhesive layers AL3-1 and AL3-2 include a first portion AL3-1 that corresponds to the first panel protective layer PPL1 and a second portion AL3-2 that corresponds to the second panel protective layer PPL2.

The support portion SUP includes a support plate PLT, coating layers CAT1 and CAT2, a cover layer COV, heat dissipation layers RHL1 and RHL2, cushion layers CUL1 and CUL2, and insulating tapes ITAP1 and ITAP2. The support portion SUP is disposed under and supports the display portion DSP.

The support plate PLT is disposed under the panel protective layers PPL1 and PPL2.

The support plate PLT includes a first support part PLT1 that overlaps the first non-foldable region NFA10, a second support part PLT2 that overlaps the second non-foldable region NFA20, and a foldable part PLT-F that overlaps the foldable region FA0. The first support part PLT1, the second support part PLT2, and the foldable part PLT-F have an integral shape.

The foldable part PLT-F has a plurality of openings OP formed therein that penetrate through the foldable part PLT-F. The openings OP are arranged so that the foldable region FA0 has a grid shape on a plane. Since the flexibility of the foldable part PLT-F is increased by the openings OP, the foldable part PLT-F can be easily folded.

However, embodiments of the inventive concept are not necessarily limited thereto, and in an embodiment, both end portions of the foldable part PLT-F have a plurality of grooves formed therein. For example, the foldable part PLT-F includes both openings and grooves mixed and formed therein. The grooves are formed by removing the lower surface of the support plate PLT to a predetermined depth.

The support plate PLT contains a metal. For example, the support plate PLT contains stainless steel, but the metal of the support plate PLT is not necessarily limited thereto. In addition, embodiments of the inventive concept are not necessarily limited thereto, and in an embodiment, the support plate PLT contains a non-metallic material. For example, the support plate PLT contains a reinforced fiber composite such as carbon fiber reinforced plastic (CFRP) or glass fiber reinforced plastic (GFRP).

The fourth adhesive layer ALA is disposed between the support plate PLT and the panel protection layers PPL1 and PPL2. The fourth adhesive layer AL4 couples the support plate PLT and the panel protective layers PPL1 and PPL2 to each other. The fourth adhesive layer ALA is not disposed in the foldable region FA0, and accordingly, the flexibility of the foldable part PLT-F is increased.

The coating layers CAT1 and CAT2 are disposed on the support plate PLT. The coating layers CAT1 and CAT2 are coated on the upper surface of the support plate PLT. The coating layers CAT1 and CAT2 are black and absorb light. For example, when the display unit DU is viewed from above the display unit DU, components disposed under the coating layers CAT1 and CAT2 cannot be visually recognized.

The coating layers CAT1 and CAT2 include a first coating layer CAT1 that overlaps the first non-foldable region NFA10 and a second coating layer CAT2 that overlaps the second non-foldable region NFA20. The coating layers CAT1 and CAT2 are not disposed in the foldable region FA0.

The cover layer COV is disposed under the support plate PLT. The cover layer COV overlaps the foldable region FA0 and covers the openings OP in the support plate PLT. Since the cover layer COV covers the openings OP, foreign substances cannot penetrate into the display portion DSP through the openings OP. The cover layer COV may overlap only the foldable area, or may further cover at least a portion of the first non-foldable region NFA10 or the second non-foldable region NFA20.

The cover layer COV has an elastic modulus that is lower than that of the support plate PLT. For example, the cover layer COV contains thermoplastic polyurethane or rubber, but the material of the cover layer COV is not necessarily limited thereto. The cover layer COV is manufactured as a sheet and attached to the support plate PLT.

The heat dissipation layers RHL1 and RHL2 are disposed under the support plate PLT. The heat dissipation layers RHL1 and RHL2 include a first heat dissipation layer RHL1 that overlaps the first non-foldable region NFA10 and a second heat dissipation layer RHL2 that overlaps the second non-foldable region NFA20. For example, the heat dissipation layers RHL1 and RHL2 are not disposed in the foldable region FA0. The first heat dissipation layer RHL1 and the second heat dissipation layer RHL2 are spaced apart from each other in the second direction DR2 with the cover layer COV interposed therebetween.

The heat dissipation layers RHL1 and RHL2 perform a heat dissipation function. According to an embodiment of the inventive concept, the first heat dissipation layer RHL1 contains graphite. The second heat dissipation layer RHL2 contains a metal. For example, the second heat dissipation layer RHL2 contains copper. However, the materials of the first and second heat dissipation layers RHL1 and RHL2 are not necessarily limited thereto.

In addition, each of the first and second heat dissipation layers RHL1 and RHL2 is attached to the lower surface of the support plate PLT by an adhesive layer.

The cushion layers CUL1 and CUL2 are disposed under the heat dissipation layers RHL1 and RHL2. The cushion layers CUL1 and CUL2 include a first cushion layer CUL1 that overlaps the first non-foldable region NFA10 and is disposed under the first heat dissipation layer RHL1, and a second cushion layer CUL2 that overlaps the second non-foldable region NFA20 and is disposed under the second heat dissipation layer RHL2. The cushion layers CUL1 and CUL2 are not disposed in the foldable region FA0.

The cushion layers CUL1 and CUL2 absorb external shocks applied to the lower portion of the display unit DU and protect the display panel DP. The cushion layers CUL1 and CUL2 include a foam sheet that has a predetermined elastic force. In addition, the cushion layers CUL1 and CUL2 are attached to the lower surfaces of each of the first heat dissipation layer RHL1 and the second heat dissipation layer RHL2 by an adhesive layer.

The insulating tapes ITAP1 and ITAP2 are disposed under the cushion layers CUL1 and CUL2. The insulating tapes ITAP1 and ITAP2 include a first insulating tape ITAP1 that overlaps the first non-foldable region NFA10 and is attached to the lower surface of the first cushion layer CUL1, and a second insulating tape ITAP2 that overlaps the second non-foldable region NFA20 and is attached to the lower surface of the second cushion layer CUL2. Each of the insulating tapes ITAP1 and ITAP2 includes a single-sided tape.

In the first non-foldable region NFA10, the first heat dissipation layer RHL1 extends to the edge of the support plate PLT. In the first non-foldable region NFA10, the widths in the second direction DR2 of the first cushion layer CUL1 and the first insulating tape ITAP1 are less than the width of the first heat dissipation layer RHL1. For example, in the first non-foldable region NFA10, the edges of the first cushion layer CUL1 and the first insulating tape ITAP1 are disposed inward from the edge of the first heat dissipation layer RHL1.

In the second non-foldable region NFA20, the second heat dissipation layer RHL2, the second cushion layer CUL2, and the second insulating tape ITAP2 have a same width in the second direction DR2. In the second non-foldable region NFA20, the edges of the second heat dissipation layer RHL2, the second cushion layer CUL2, and the second insulating tape ITAP2 are disposed inward from the edge of the support plate PLT.

The main circuit board MC is connected to one side of the second region AA2 of the display panel DP. The main circuit board MC includes a first rear surface BS1 coupled to one side of the display panel DP and a first front surface FS1 opposite thereto.

In an embodiment, a tape TAP is disposed on the first rear surface BS1 of the main circuit board MC. The tape TAP is a conductive double-sided tape.

In addition, according to an embodiment of the inventive concept, a bridge circuit board BC (see FIG. 8) that inspects the main circuit board MC is disposed at one side of the main circuit board MC. A detailed description thereof will be given below.

Referring to FIG. 7, in an embodiment, when the bendable region BA of the display panel DP is bent, the second region AA2 of the display panel DP is disposed under the first region AAL. According to an embodiment of the inventive concept, the second region AA2 is disposed under the first heat dissipation layer RHL1. Accordingly, the driving chip DIC and the main circuit board MC are disposed under the first region AA1.

The first rear surface BS1 of the main circuit board MC faces the lower surface of the first heat dissipation layer RHL1. The main circuit board MC is attached to the lower surface of the first heat dissipation layer RHL1 by the tape TAP. The main circuit board MC is adjacent to the first cushion layer CUL1 and the first insulating tape ITAP1.

The tape TAP is connected to the ground terminal of the main circuit board MC. Accordingly, the ground terminal of the main circuit board MC is electrically connected to the first heat dissipation layer RHL1 through the tape TAP, and the first heat dissipation layer RHL1 serves as a ground.

Figure 8:
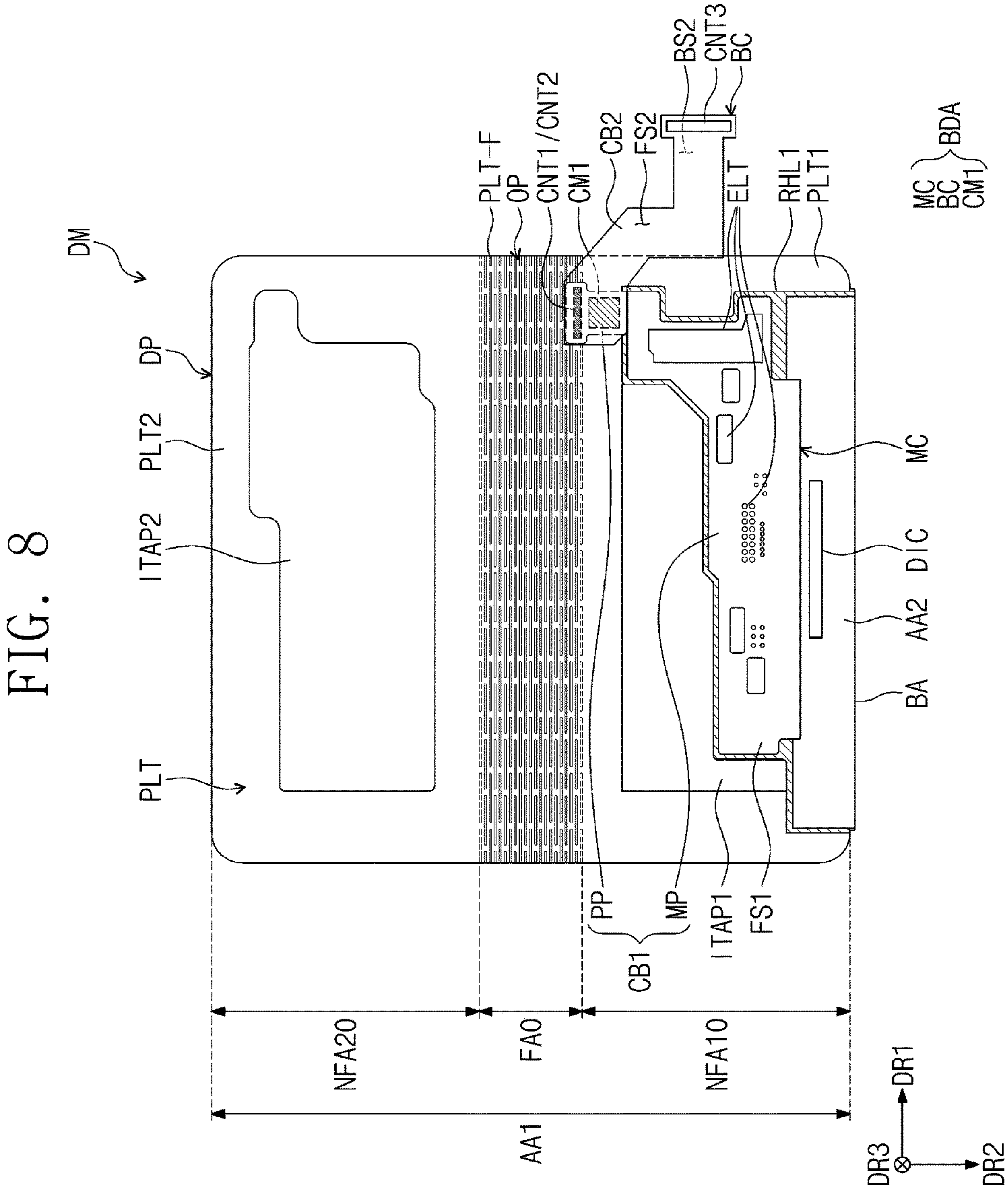
FIG. 8 is a plan view of a display module according to an embodiment of the inventive concept.

FIG. 8 is a plan view of a display module according to an embodiment of the inventive concept.

In an embodiment of the inventive concept, the 'display module DM' includes the bridge circuit board BC and a compensator coupled to the display unit DU described with reference to FIG. 3. By using the display module DM, the main circuit board MC can be inspected for defects. In an embodiment, the main circuit board MC, the bridge circuit board BC coupled thereto, and the compensator are defined as a board assembly BDA.

The display module DM according to an embodiment can performing an inspection to detect a defect in the main circuit board MC. For example, before the main circuit board MC is included as a component of the electronic device ED by being attached to the electronic module EM (see FIG. 4), such as the control module 10 (see FIG. 4), the display module DM performs a defect inspection of the main circuit board MC to detect a defective main circuit board MC.

FIG. 8 illustrates the rear surface of the display module DM, and the bendable region BA and the second region AA2 of the display panel DP and the support plate PLT, the heat dissipation layers RHL1 and RHL2 and the insulating tapes ITAP1 and ITAP2 are exposed from the lower portion of the display module DM. The same/similar reference numerals will be used for the same/similar components as those described with reference to FIGS. 1A to 7, and duplicate descriptions will be omitted. Hereinafter, the board assembly BDA will be described in detail.

According to this embodiment, the main circuit board MC include a first circuit board CB1 and a first connector CNT1. The first circuit board CB1 includes a main portion MP and a protruding portion PP.

A plurality of elements ELT are disposed in the main portion MP. The elements ELT include a resistor, a capacitor, an inductor, a plurality of terminals, and a plurality of wirings, as well as a timing controller and a voltage generator.

The main portion MP is disposed under the first heat dissipation layer RHL1. According to an embodiment of the inventive concept, the main portion MP is a portion to which the tape TAP (see FIGS. 6 and 7) is attached, and is coupled to the first heat dissipation layer RHL1 by the tape TAP.

The protruding portion PP protrudes from the main portion MP. The first connector CNT1 is disposed in the protruding portion PP. In this specification, a "connector" is an attachable and detachable electronic component that is a connection mechanism that electrically interconnects circuit boards.

The protruding portion PP includes a portion that is bent to connect the first connector CNT1 to the control module 10 (see FIG. 4). According to an embodiment of the inventive concept, the tape TAP is not attached to the protruding portion PP.

The first circuit board CB1 has an "L-shape", but the shape of the first circuit board CB1 is not necessarily limited thereto.

The first connector CNT1 is disposed at an end portion of the protruding portion PP of the first circuit board CB1. The first connector CNT1 is disposed on the first front surface FS1. The first connector CNT1 according to an embodiment electrically connects the main circuit board MC and the bridge circuit board BC to each other.

According to an embodiment, the bridge circuit board BC includes a second circuit board CB2, a second connector CNT2, and a third connector CNT3.

The second circuit board CB2 overlaps a portion of the first circuit board CB1 and is disposed on the first circuit board CB1. According to an embodiment of the inventive concept, the second circuit board CB2 overlaps the protruding portion PP of the first circuit board CB1.

The second circuit board CB2 includes a second rear surface BS2 that at least partially faces the first circuit board CB1 and a second front surface FS2 opposite thereto.

The second connector CNT2 is disposed in the second circuit board CB2. The second connector CNT2 is disposed on the second rear surface BS2 of the second circuit board CB2. The second connector CNT2 is disposed at one end of the second circuit board CB2 adjacent to the first circuit board CB1. The second connector CNT2 is disposed on and coupled to the first connector CNT1. The second connector CNT2 overlaps the first connector CNT1.

The third connector CNT3 is disposed in the second circuit board CB2. The third connector CNT3 is an electronic component coupled to an inspection device TD (see FIG. 13B) that detects a defect in the main circuit board MC. The third connector CNT3 is disposed on the other end of the second circuit board CB2 from the second connector CNT2. Since the third connector CNT3 does not overlap the display panel DP, the third connector CNT3 is easily coupled to the inspection device TD, and damage does not occur to the display unit DU (see FIG. 3) during a coupling process.

According to an embodiment of the inventive concept, the third connector CNT3 is disposed on the second front surface FS2 of the second circuit board CB2. However, embodiments of the inventive concept are not necessarily limited thereto, and in an embodiment, the third connector CNT3 is disposed on the second rear surface BS2.

According to an embodiment, a separation space SP (see FIG. 9B) is formed between the first circuit board CB1 and the second circuit board CB2. The separation space SP is adjacent to a portion where the first connector CNT1 and the second connector CNT2 are coupled to each other. For example, the separation space SP is generated between the first circuit board CB1 and the second circuit board CB2 due to the thickness of coupled the first and second connectors CNT1 and CNT2.

According to an embodiment of the inventive concept, the compensator overlaps at least a portion of the separation space SP. The compensator includes at least one of a first compensator CM1 and a second compensator CM2 (see FIG. 10A), and FIG. 8 illustrates the first compensator CM1 disposed inside the separation space SP.

In an embodiment of the inventive concept, when an external force acts on the second circuit board CB2, the compensator prevents the second circuit board CB2 from warping due to the separation space SP, or furthermore, becoming spaced apart from the second connector CNT2. A detailed description of the compensator will be given below.

Figure 9A:
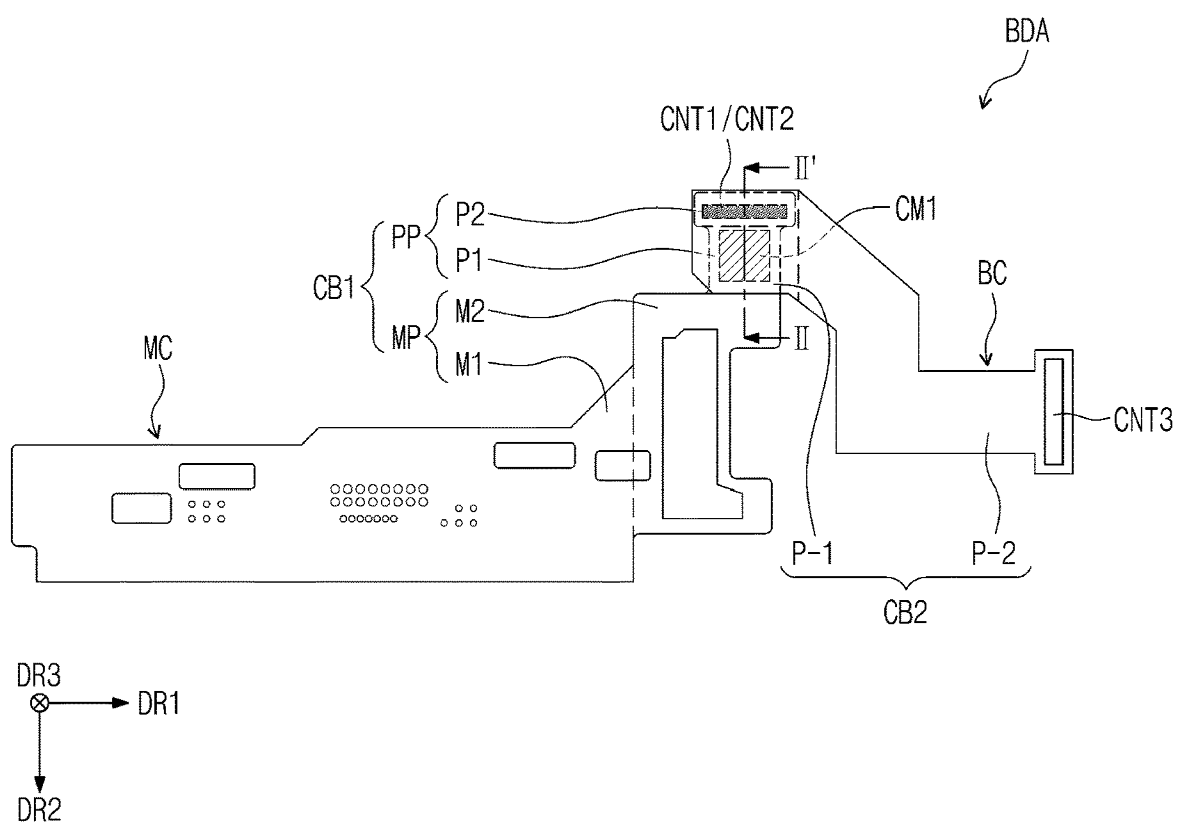
FIG. 9A is a plan view of a display module according to an embodiment of the inventive concept.
Figure 9B:
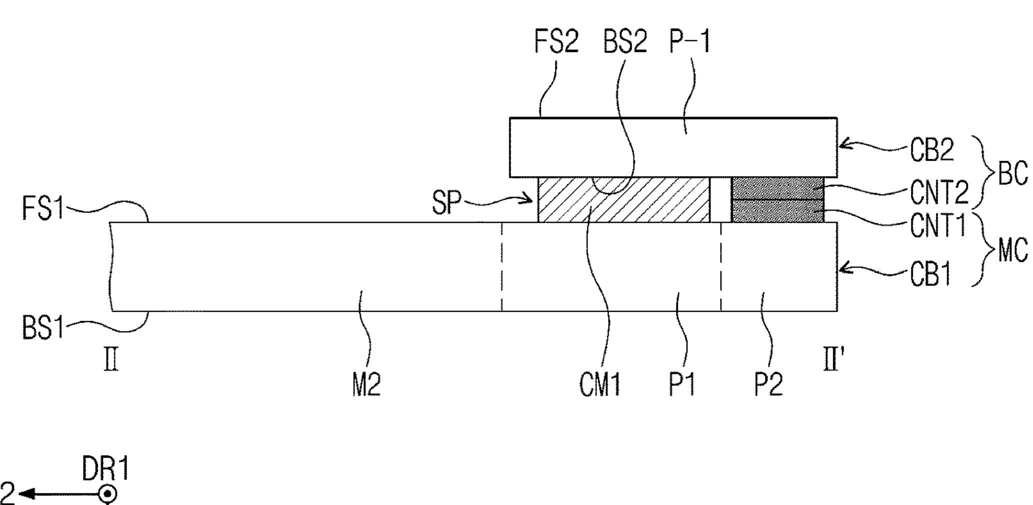
FIG. 9B is a cross-sectional view taken along line I-I' of FIG. 9A.

FIG. 9A is a plan view of a board assembly BDA according to an embodiment of the inventive concept. FIG. 9B is a cross-sectional view taken along line I-4' of FIG. 9A.

Referring to FIGS. 9A and 9B, the board assembly BDA according to an embodiment includes a main circuit board MC, a bridge circuit board BC, and a first compensator CM1. In an embodiment, the compensator is the first compensator CM1.

The main circuit board MC includes a first circuit board CB1 and a first connector CNT1. The first circuit board CB1 includes a main portion MP and a protruding portion PP that protrudes therefrom.

According to an embodiment, the main portion MP includes a first main portion M1 and a second main portion M2.

The first main portion M1 extends in the first direction DR1. The second main portion M2 extends from one side of the first main portion M1 in the second direction DR2.

The protruding portion PP includes a first protruding portion P1 and a second protruding portion P2.

The first protruding portion P1 extends from the second main portion M2 in the second direction DR2. As illustrated in FIG. 9B, the first protruding portion P1 is where the separation space SP is formed. The second protruding portion P2 extends from the first protruding portion P1 in the second direction DR2. The second protruding portion P2 is where the first connector CNT1 is disposed.

According to an embodiment, in the first direction DR1, the maximum width of the first protruding portion P1 is less than the maximum width of the second main portion M2 and the maximum width of the second protruding portion P2. Accordingly, in a process of bending the first protruding portion P1 to couple the first connector CNT1 to the control module 10 (see FIG. 4), the bending can be smoothly performed.

The second circuit board CB2 includes a first portion P-1 and a second portion P-2.

The first portion P-1 overlaps the protruding portion PP of the first circuit board CB1. A second connector CNT2 is disposed in a portion of the first portion P-1 that overlaps the first protruding portion P1. A portion of the first portion P-1 that overlaps the protruding portion PP, and the first protruding portion P1 form a separation space SP therebetween.

The second portion P-2 does not overlap the first circuit board CB1. A third connector CNT3 is disposed on the second portion P-2.

The second portion P-2 has an "L" shape, in which an end portion thereof adjacent to the first portion P-1 is inclined, and includes a portion that extends in the second direction DR2 and a portion that extends therefrom in the first direction DR1. However, the shape of the second portion P-2 is not necessarily limited thereto.

According to an embodiment, the first compensator CM1 is disposed in the separation space SP. The first compensator CM1 is in contact with the first front surface FS1 of the first circuit board CB1 and the second rear surface BS2 of the second circuit board CB2. That is, the thickness of the first compensator CM1 is equal to the combined thickness of the first connector CNT1 and the second connector CNT2.

According to an embodiment of the inventive concept, the first compensator CM1 is an adhesive film. For example, the first compensator CM1 is a single-sided adhesive film. The first compensator CM1 is attached only to the second rear surface BS2 of the second circuit board CB2. Accordingly, in a process of removing the bridge circuit board BC and the first compensator CM1 from the main circuit board MC after inspecting of the main circuit board MC for defects, damage does not occur to the main circuit board MC. The single-sided adhesive film contains an adhesive agent or a glue. For example, the first compensator CM1 contains a polymer, and the polymer includes polyethylene terephthalate (PET).

According to an embodiment of the inventive concept, the first compensator CM1 is a plastic foam. For example, the first compensation member CM1 contains a polymer, and the polymer includes at least one of polyurethane (PU), polystyrene (PS), polyethylene (PE), polypropylene (PP), or polyethylene terephthalate (PET). For example, the first compensator CM1 is attached to the rear surface of the second circuit board CB2 by a separate adhesive member.

According to an embodiment, since the separation space SP is filled with the first compensator CM1, deformation of the bridge circuit board BC is minimized even when the bridge circuit board BC is pressed by an external force. By minimizing damage to the bridge circuit board BC, the inspection reliability of the main circuit board MC is increased.

In addition, according to an embodiment of the inventive concept, the board assembly BDA further includes a cover member disposed on the first circuit board CB1 and the second circuit board CB2. For example, the cover member is attached to the first front surface FS1 of the first circuit board CB1 and covers a portion of the first circuit board CB1 and a portion of the second circuit board CB2. In the process of attaching the cover member, a pressing force is applied to the second circuit board CB2, but as the separation space SP is filled, deformation of the bridge circuit board BC is minimized.

Figure 10A:
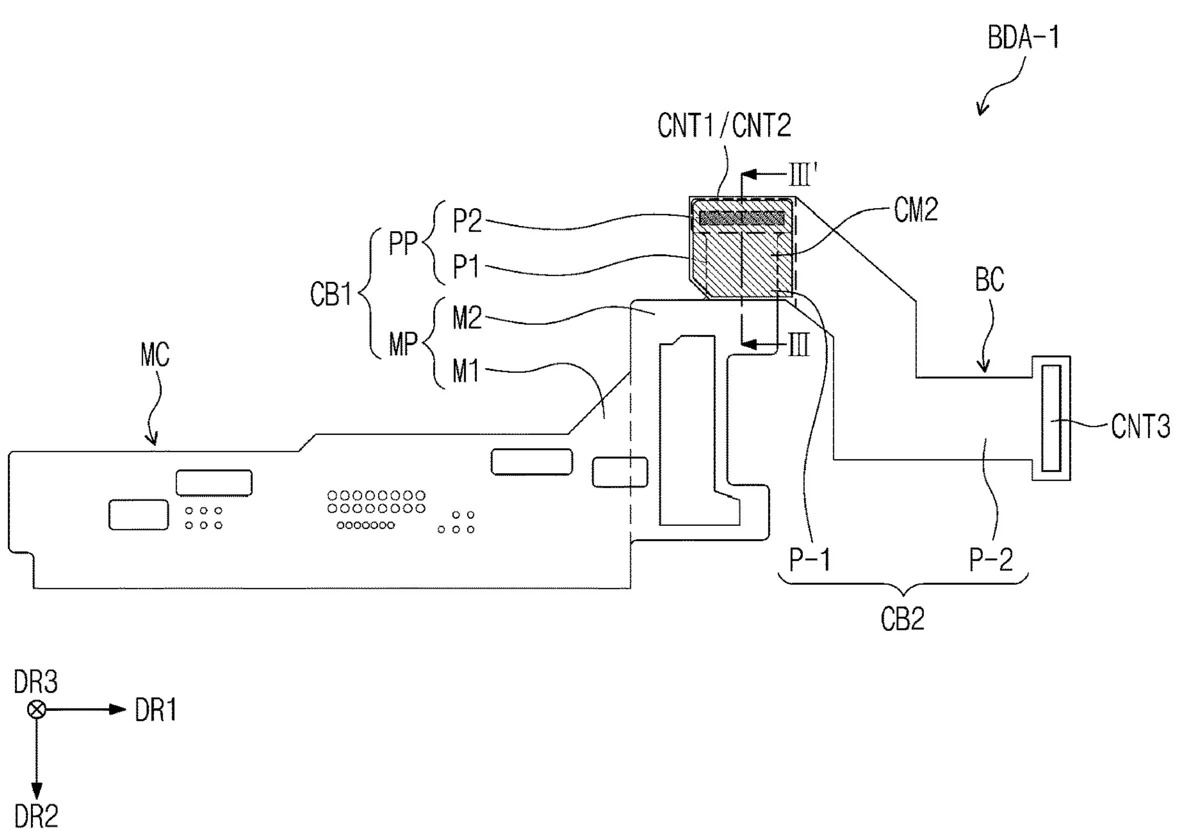
FIG. 10A is a plan view of a display module according to an embodiment of the inventive concept.
Figure 10B:
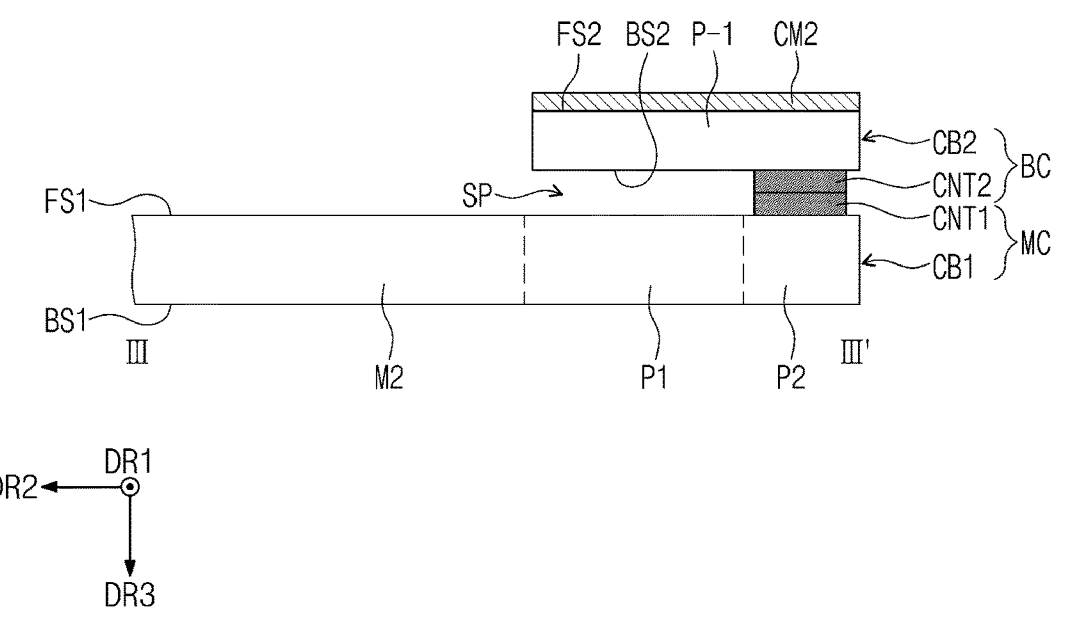
FIG. 10B is a cross-sectional view taken along II-II' of FIG. 10A.

FIG. 10A is a plan view of a board assembly BDA-1 according to an embodiment of the inventive concept. FIG. 10B is a cross-sectional view taken along II-II' of FIG. 10A.

Referring to FIGS. 10A and JOB, the board assembly BDA-1 according to an embodiment includes a main circuit board MC, a bridge circuit board BC, and a second compensator CM2. For example, in an embodiment, the compensator is the second compensator CM2. The same/similar reference numerals will be used for the same/similar components as those described with reference to FIGS. 1 to 9B, and duplicate descriptions will be omitted.

According to an embodiment, the second compensator CM2 is disposed on the second front surface FS2 of the second circuit board CB2. The second compensator CM2 overlaps the separation space SP and the second connector CNT2. For example, the second compensator CM2 is disposed on the entire first portion P-1. However, an embodiment of the inventive concept is not necessarily limited thereto and, on a plane, the left edge and the right edge of the second compensator CM2 are respectively aligned with the left edge and the right edge of the protruding portion PP of the first circuit board CB1.

According to an embodiment of the inventive concept, the second compensator CM2 contains at least one of a metal or a polymer. The metal includes stainless steel (SUS). The metal increases the rigidity of a portion of the second circuit board CB2 to which a pressing force is applied to couple the first connector CNT1 and the second connector CNT2 to each other to minimize damage caused by the pressing force.

The polymer has a predetermined level of elasticity or hardness. For example, the polymer includes an epoxy resin. When the polymer has a predetermined elasticity, a pressing force transmitted to the second circuit board CB2 is reduced by absorbing the pressing force applied to the second circuit board CB2.

According to an embodiment of the inventive concept, as the second compensator CM2 overlaps the second connector CNT2, when a predetermined force is applied to couple the first connector CNT1 and the second connector CNT2 to each other, the force is transmitted to the first and second connectors CNT1 and CNT2 so that they are easily coupled.

In an embodiment, the separation space SP is an empty space. Accordingly, by disposing the second compensator CM2 to overlap the separation space SP, even though an external force is applied to a portion adjacent to the separation space SP during transport and processing, deformation of the bridge circuit board BC is minimized as the pressing force applied to the bridge circuit board BC is dispersed by the second compensator CM2. Accordingly, since damage to the bridge circuit board BC is minimized, the inspection reliability of the main circuit board MC is increased.

Figure 11A:
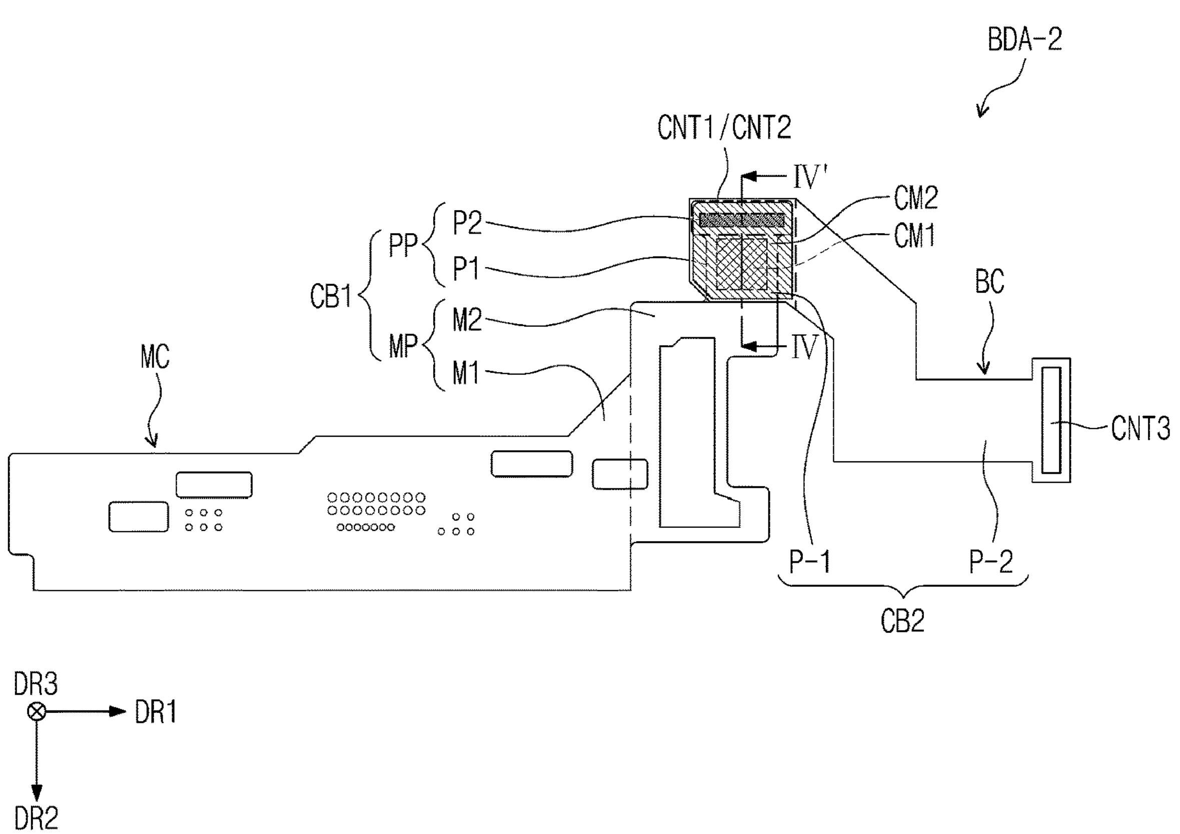
FIG. 11A is a plan view of a display module according to an embodiment of the inventive concept.
Figure 11B:
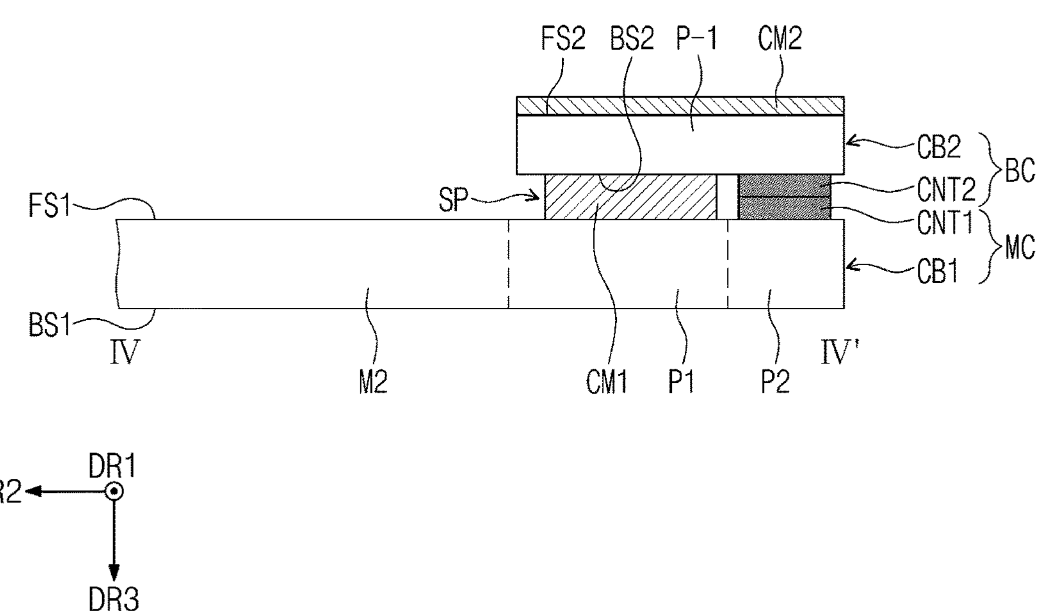
FIG. 11B is a cross-sectional view taken along line III-III' of FIG. 11A.

FIG. 11A is a plan view of a board assembly BDA-2 according to an embodiment of the inventive concept. FIG. 11B is a cross-sectional view taken along line III-III' of FIG. 11A.

Referring to FIGS. 11A and 11B, the board assembly BDA-2 according to an embodiment includes a main circuit board MC, a bridge circuit board BC, a first compensator CM1, and a second compensator CM2. In an embodiment, a plurality of compensators are provided, and the compensators include a first compensator CM1 and a second compensator CM2.

The first compensator CM1 corresponds to the first compensator CM1 described with reference to FIGS. 9A and 9B, and the second compensator CM2 corresponds to the second compensator CM2 described with reference to FIGS. 10A and 10B. The same/similar reference numerals will be used for the same/similar components as those described with reference to FIGS. 1 to 10B, and duplicate descriptions will be omitted.

The first compensator CM1 is disposed in the separation space SP and on the first front surface FS1 of the first circuit board CB1 and the second rear surface BS2 of the second circuit board CB2. The second compensator CM2 is disposed on the second front surface FS2 of the second circuit board CB2 and overlaps the separation space SP and the second connector CNT2. By including the first compensator CM1 to fill the separation space SP and the second compensator CM2 to disperse a pressing force, deformation of the bridge circuit board BC is minimized.

Figure 12:
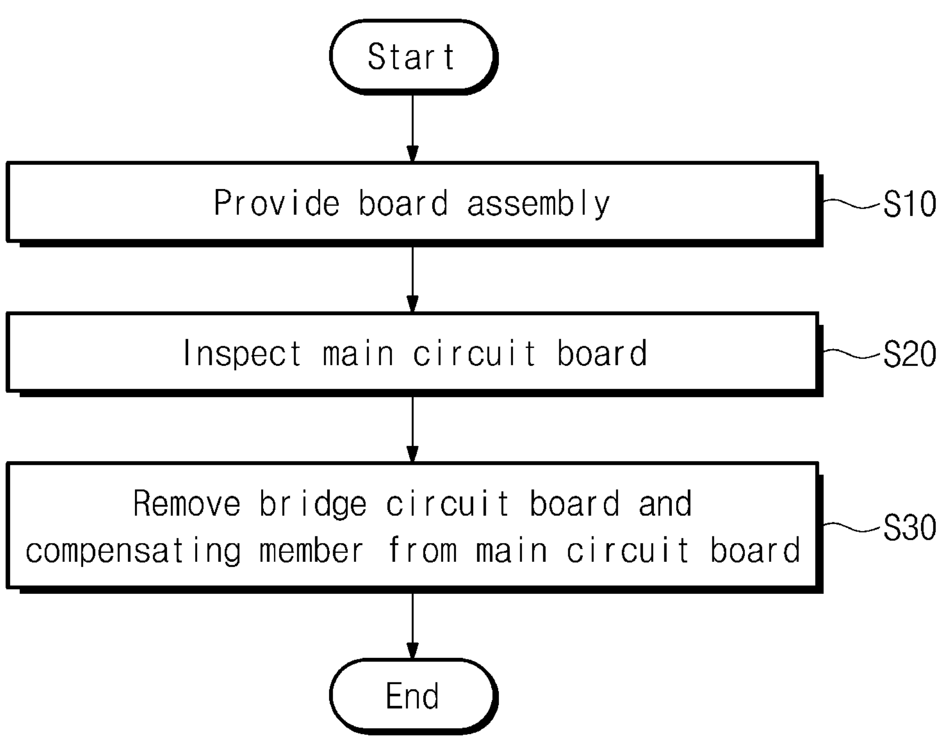
FIG. 12 is a flowchart of an inspection method of a display module according to an embodiment of the inventive concept.
Figure 13C:
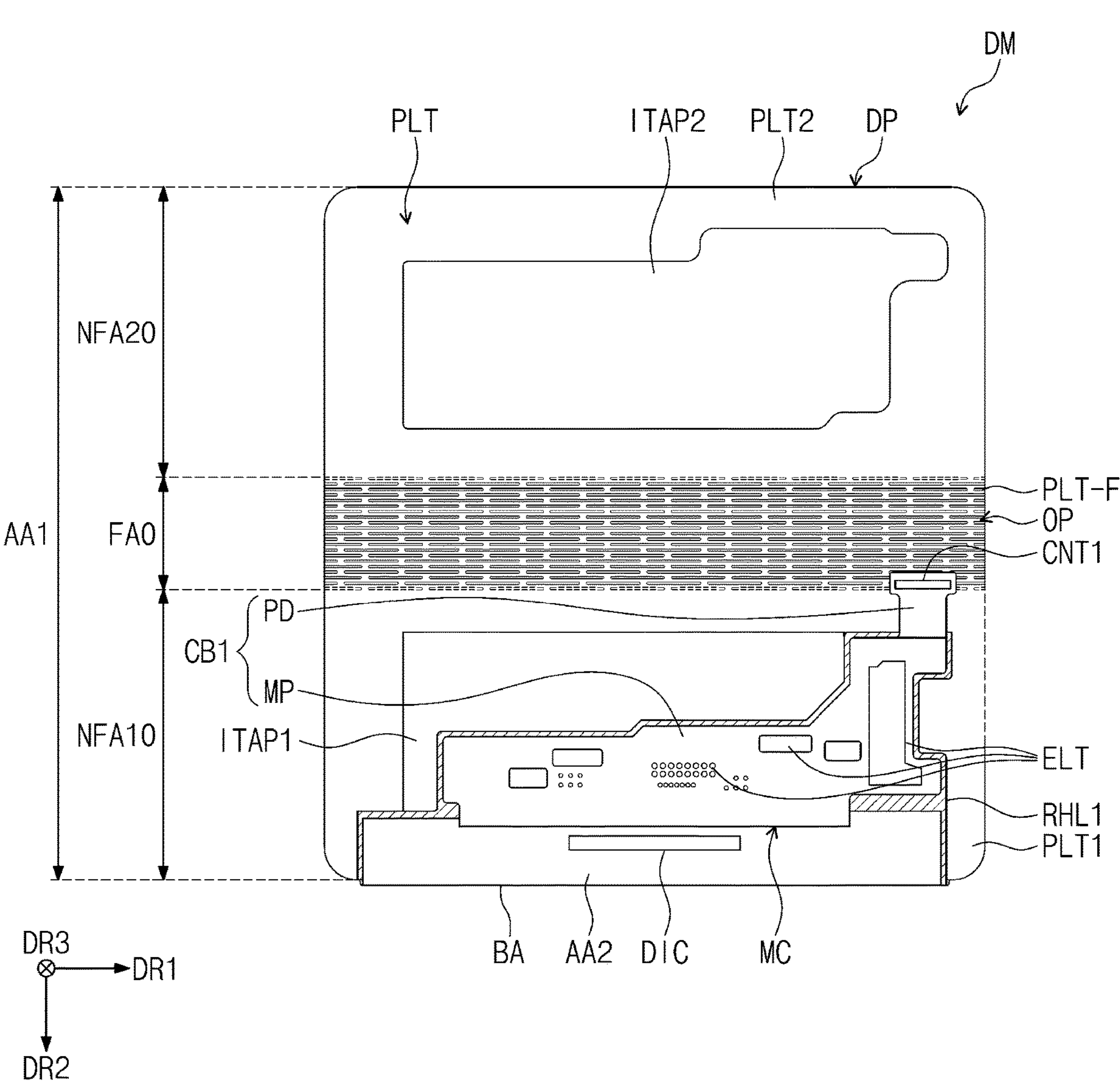

FIG. 12 is a flowchart of an inspection method of a display module according to an embodiment of the inventive concept. FIGS. 13A to 13C are plan views that illustrate an inspection method of a display module according to an embodiment of the inventive concept. FIGS. 13A to 13C are plan views of the display module DM viewed from the bottom of the display module DM. The same/similar reference numerals will be used for the same/similar components as those described with reference to FIGS. 1 to 11B, and duplicate descriptions will be omitted.

Referring to FIG. 12, an inspection method of a display module DM according to an embodiment includes providing a board assembly BDA (see FIG. 8)(S10), inspecting the main circuit board MC (see FIG. 8) (S20), and separating the bridge circuit board BC (see FIG. 8) and the compensator from the main circuit board MC (S30).

In an embodiment, the board assembly BDA includes a main circuit board MC, a bridge circuit board BC, and a compensator. According to an embodiment, the board assembly BDA includes the main circuit board MC, the bridge circuit board BC, and the compensator coupled to each other in the display module DM.

The compensator includes at least one of a first compensator CM1 (see FIG. 8) or a second compensator CM2 (see FIG. 10A). Hereinafter, an inspection method of a display module DM will be described assuming that the compensator is the first compensator CM1.

Referring to FIG. 13A, an inspection method of a display module DM according to an embodiment includes providing the board assembly BDA (S10). The board assembly BDA includes a main circuit board MC, a bridge circuit board BC, and a first compensation member CM1.

According to an embodiment, when providing the board assembly BDA (S10), the board assembly BDA is provided in a state in which the bendable region BA is coupled to the display panel DP in a bent state. For example, the board assembly BDA is disposed at the lower portion of the display module DM and is bonded to the first heat dissipation layer RHL1.

As the main circuit board MC is coupled to the second region AA2 of the display panel DP and the bendable region BA of the display panel DP is bent, the board assembly BDA is disposed at the lower portion of the display module DM and is attached to the first heat dissipation layer RHL1. As the display module DM illustrated in FIG. 13A corresponds to the display module DM described in FIG. 8, reference shall be made to FIG. 8 for the detailed description thereof.

Referring to FIG. 13B, an inspection method of a display module DM according to an embodiment includes inspecting the main circuit board MC (S20). As illustrated in FIG. 13B, the third connector CNT3 of the bridge circuit board BC is coupled to the inspection device TD. For example, before the main circuit board MC is inspected, an inspection method includes coupling the third connector CNT3 of the bridge circuit board BC to the inspection device TD.

The inspection device TD according to an embodiment of the inventive concept can detect a defective main circuit board MC. For example, the inspection device TD can inspect whether an electrical defect has occurred inside the main circuit board MC, whether an electrical defect has occurred in the connection between the main circuit board MC and the display panel DP, etc.

After the inspection of the main circuit board MC is completed, the third connector CNT3 is separated from the inspection device TD.

According to an embodiment of the inventive concept, since the board assembly BDA includes the first compensator CM1, damage to the bridge circuit board BC is minimized, and the reliability of detecting a defect in the main circuit board MC is increased. Accordingly, the display unit DU (see FIG. 3) with a more reliable main circuit board MC can be provided.

In addition, since the bridge circuit board BC can be reused multiple times, the defect inspection of the main circuit board MC is performed more economically.

Referring to FIG. 13C, a inspection method of a display module DM according to an embodiment includes separating the bridge circuit board BC and the compensator from the main circuit board MC (S30). For example, the second connector CNT2 of the bridge circuit board BC is separated from the first connector CNT1 of the main circuit board MC. Accordingly, the bridge circuit board BC is separated from the main circuit board MC, and the first compensator CM1 attached to the bridge circuit board BC is also removed from the main circuit board MC.

Hereafter, the electronic device ED (see FIG. 1) is manufactured by bending the first protruding portion P1 (see FIG. 9A) of the first circuit board CB1 of the main circuit board MC and coupling the first connector CNT1 to the control module 10 (see FIG. 4).

According to an embodiment of the inventive concept, the electronic device ED (see FIG. 1) with increased reliability is provided by detecting a defect in the main circuit board MC before completing the electronic device ED (see FIG. 1).

Figure 14A:
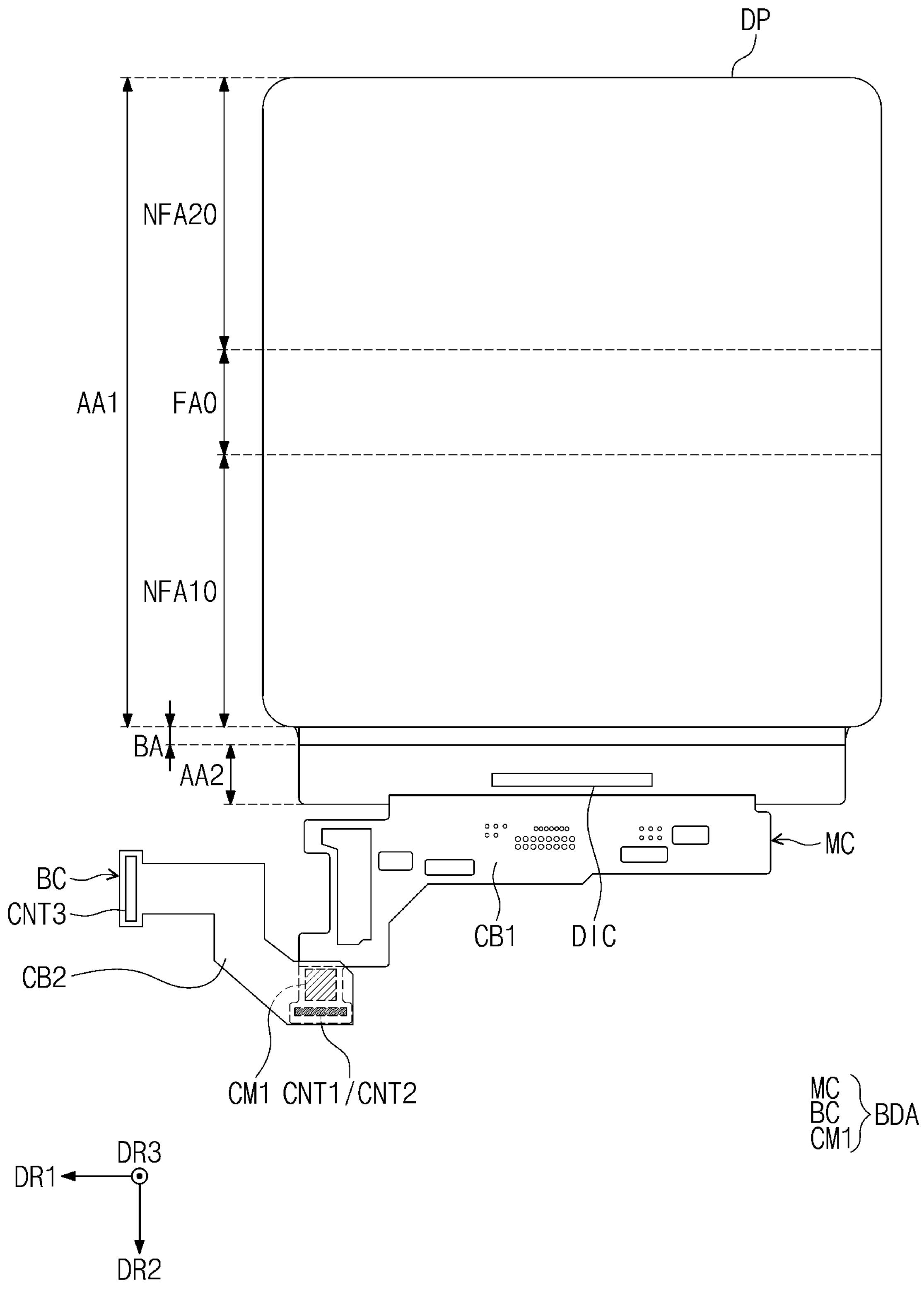
FIGS. 14A and 14B illustrate an inspection method of a display module according to an embodiment of the inventive concept.
Figure 14B:
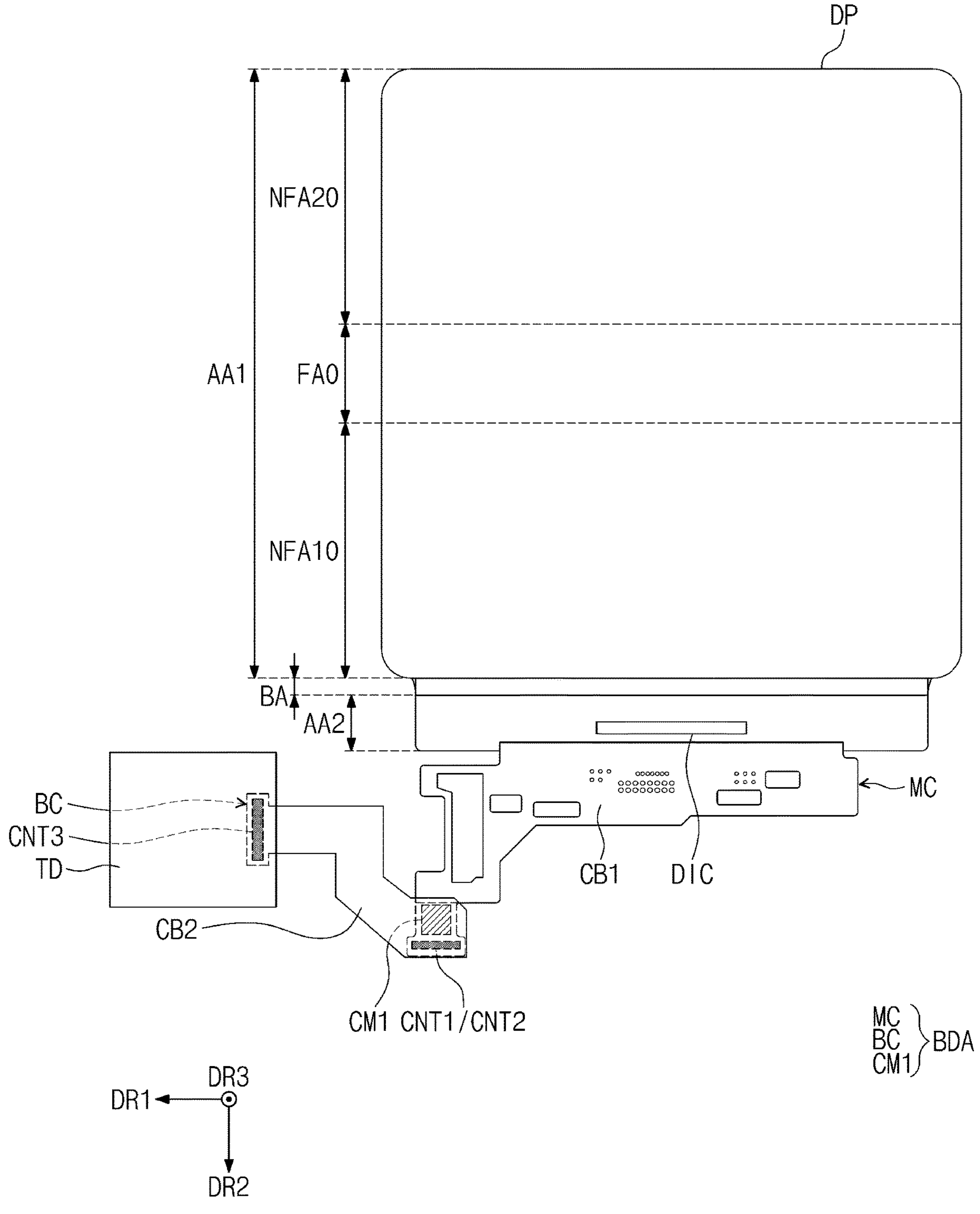

FIGS. 14A and 14B illustrate an inspection method of a display module according to an embodiment of the inventive concept. FIGS. 14A and 14B are plan views of the display module DM viewed from the bottom of the display module DM. The same/similar reference numerals will be used for the same/similar components as those described with reference to FIGS. 1 to 13C, and duplicate descriptions will be omitted.

Referring to FIGS. 14A and 148, an inspection method of a display module DM according to an embodiment of the inventive concept further includes, prior to providing the board assembly BDA, coupling the board assembly BDA to the display panel DP, inspecting the board assembly BDA coupled to the display panel DP, and bending the display panel DP.

As illustrated in FIG. 14A, in an embodiment, when coupling the board assembly BDA to the display panel DP, the main circuit board MC is coupled to the display panel DP.

The display panel DP according to an embodiment includes a bendable region BA that is bent with respect to a virtual axis that extends in the first direction DR1, a first region AA1 in which the pixels PX (see FIG. 5A) are disposed, and a second region AA2 spaced apart in the second direction DR2 from the first region AA1 with the bendable region interposed therebetween. For example, the bendable region BA of the display panel DP has not yet been bent.

The main circuit board MC is coupled to one end of the second region AA2. For example, the display pads PD-D (see FIG. 5A) disposed adjacent to the lower end of the second region AA2 and the board pads PD-F (see FIG. 5A) disposed on the main circuit board MC are connected to each other.

As illustrated in FIG. 14B, in an embodiment, when inspecting the board assembly BDA coupled to the display panel DP, the third connector CNT3 of the bridge circuit board BC is coupled to the inspection device TD.

According to an embodiment, by performing a defect inspection of the main circuit board MC after attaching the board assembly BDA to the display panel DP, a defective main circuit board MC can be detected.

After the inspection of the main circuit board MC is completed, the third connector CNT3 is separated from the inspection device TD.

Hereafter, by attaching the window module WM (see FIG. 6) to the upper portion of the display panel DP and then attaching other components of the display portion DSP (see FIG. 6), except for the display panel DP and the support portion SUP (see FIG. 6), to the lower portion of the display panel DP, the display module DM corresponding to FIG. 6 is manufactured. However, embodiments of the inventive concept are not necessarily limited thereto, and in an embodiment, during a process of attaching the window module WM, the components of the display portion DSP, and the components of the support portion SUP to the display panel DP, the board assembly BDA is coupled to the display panel DP.

Hereafter, the bendable region BA of the display panel DP is bent with respect to a virtual axis that extends in the first direction DR1 so that the second region AA2 of the display panel DP is disposed under the first region AA1. For example, the board assembly BDA is disposed under the first region AA1 of the display panel DP to form the display module DM described with reference to FIG. 13A.

According to embodiments of the inventive concept, a phenomenon in which a bridge circuit board is bent or separated from the connector due to the separation space formed between the main circuit board and the bridge circuit board can be prevented. Accordingly, the occurrence of defects in the bridge circuit board is reduced and the inspection reliability of the display module is increased.

Although the above has been described with reference to embodiments of the inventive concept, those skilled in the art or those of ordinary skill in the art will understand that various modifications and changes can be made to embodiments of the inventive concept within the scope that does not depart from the spirit and technical field of embodiments of the inventive concept described in the following claims. Accordingly, the technical scope of embodiments of the inventive concept should not be limited to the content described in the detailed description of embodiments of the disclosure, but should be determined by the claims as hereinafter described.

What is claimed is:

1. A display module, comprising:

a display panel that includes at least one pixel;

a main circuit board that includes a first circuit board that includes a main portion connected to the display panel and a protruding portion that protrudes from the main portion, and a first connector disposed in the protruding portion;

a bridge circuit board that includes a second circuit board that at least partially overlaps the first circuit board, and a second connector disposed in the second circuit board and coupled to the first connector; and a compensator, wherein:

a separation space is formed between the first circuit board and the second circuit board, the separation space is located at one side of the coupled first connector and the second connector, and the compensator is disposed within the separation space has an uppermost surface co-planar with an uppermost surface of the second connector and a lowermost surface co-planar with a lowermost surface of the first connector, wherein a thickness of the compensator is substantially equal to a combined thickness of the first connector and the second connector.

2. The display module of claim 1, wherein the compensator is in contact with the first circuit board and the second circuit board.

3. The display module of claim 1, wherein the compensator is attached only to the second circuit board.

4. The display module of claim 1, wherein the compensator contains a polymer.

5. The display module of claim 1, wherein:

the second circuit board includes a rear surface on which the second connector is disposed and a front surface opposite to the rear surface; and the compensator is disposed on the front surface of the second circuit board and overlaps the second connector.

6. The display module of claim 1, wherein:

the second circuit board includes a rear surface on which the second connector is disposed and a front surface opposite to the rear surface;

the compensator includes a plurality of compensators; and the plurality of compensators include a first compensator in contact with the first and second circuit boards and a second compensator disposed on the front surface of the second circuit board and that overlaps the second connector.

7. The display module of claim 6, wherein the first compensator is attached only to the rear surface of the second circuit board.

8. The display module of claim 6, wherein:

the first compensator comprises a polymer; and the second compensator comprises at least one of a metal or a polymer.

9. The display module of claim 1, wherein:

the display panel comprises a first region in which the pixel is disposed, a second region spaced apart from the first region, and a bendable region that is bent with respect to a first virtual axis that extends in a first direction and extends in a second direction that crosses the first direction from the first region to the second region; and the main circuit board is coupled to one end of the second region and is spaced apart from the bendable region of the display panel.

10. The display module of claim 9, wherein:

the main circuit board and a portion of the bridge circuit board overlap the first region in a third direction that is normal to a plane defined by the first and second directions; and a remaining portion of the bridge circuit board does not overlap the first region in the third direction.

11. The display module of claim 9, wherein the first region comprises:

a foldable region that is folded with respect to a second virtual axis extending in the first direction; and a first non-foldable region and a second non-foldable region that are spaced apart from each other in a second direction that crosses the first direction with the foldable region interposed therebetween.

12. The display module of claim 1, wherein:

the main portion includes a first main portion that extends in a first direction and a second main portion that extends from one side of the first main portion in a second direction that crosses the first direction;

the protruding portion includes a first protruding portion that extends from the second main portion in the second direction and a second protruding portion that extends from the first protruding portion in the second direction and includes the second connector disposed therein;

the separation space is formed between the first protruding portion and the second circuit board, and in the first direction, a maximum width of the first protruding portion is less than a maximum width of the second main portion and a maximum width of the second protruding portion.

13. The display module of claim 12, wherein:

the second circuit board includes a first portion that overlaps the protruding portion in a third direction that is normal to a plane defined by the first and second directions and a second portion that does not overlap the protruding portion in the third direction; and the bridge circuit board further includes a third connector disposed at one end of the second portion.

14. An electronic device, comprising:

a display module, comprising:

a main circuit board that includes a first circuit board that includes a main portion connected to a display panel and a protruding portion that protrudes from the main portion, and a first connector disposed in the protruding portion;

a bridge circuit board that includes a second circuit board that at least partially overlaps the first circuit board, and a second connector disposed on a rear surface of the second circuit board and that overlaps the first connector; and at least one compensator, wherein:

a separation space is formed between the first circuit board and the second circuit board and one side of the first connector and the second connector, and the at least one compensator includes at least one of a first compensator in the separation space, the first compensator has an uppermost surface co-planar with an uppermost surface of the second connector and a lowermost surface co-planar with a lowermost surface of the first connector and a second compensator disposed on a front surface of the second circuit board that is opposite to the rear surface and that overlaps the second connector, the second compensator comprises a metal, wherein a thickness of the first compensator is substantially equal to a combined thickness of the first connector and the second connector.

* * * * *